US008650013B2

(12) United States Patent
Hanley

(10) Patent No.: US 8,650,013 B2
(45) Date of Patent: Feb. 11, 2014

(54) APPARATUS AND METHOD OF DESIGNING OR OPTIMIZING A COLUMN FOR A SEPARATION PROCESS

(75) Inventor: Brian Hanley, Lowell, MA (US)

(73) Assignee: Aspen Technology, Burlington, MA (US)

( * ) Notice: Subject to any disclaimer, the term of this patent is extended or adjusted under 35 U.S.C. 154(b) by 265 days.

(21) Appl. No.: 13/192,192

(22) Filed: Jul. 27, 2011

(65) Prior Publication Data

US 2012/0029890 A1 Feb. 2, 2012

Related U.S. Application Data

(60) Provisional application No. 61/368,498, filed on Jul. 28, 2010.

(51) Int. Cl.
*G06F 17/50* (2006.01)

(52) U.S. Cl.
USPC .................................................. 703/2; 703/9

(58) Field of Classification Search
USPC ........................................................ 703/2, 9
See application file for complete search history.

(56) References Cited

U.S. PATENT DOCUMENTS

| | | | | |
|---|---|---|---|---|
| 5,644,932 A * | 7/1997 | Dunbobbin et al. | ............ | 62/640 |
| 7,604,781 B2 * | 10/2009 | Brophy et al. | ................ | 422/211 |
| 8,435,387 B2 * | 5/2013 | Hartman et al. | ................ | 203/28 |
| 2006/0016215 A1 * | 1/2006 | Tonkovich et al. | ............ | 62/617 |

OTHER PUBLICATIONS

Garcia-Ochoa, F., and Gomez, E., "Theoretical prediction of gas-liquid mass transfer coefficient, specific area and hold-up in sparged stirred tanks," *Chemical Engineering Science*, 59: 2489-2501 (2004).
Klöker, M., et al., "Rate-based modelling and simulation of reactive separations in gas/vapour-liquid systems," *Chemical Engineering and Processing*, 44: 617-629 (2005).
Mueller, I., and Kenig, E. Y., "Reactive Distillation in a Dividing Wall Column: Rate-Based Modeling and Simulation," *Ind. Eng. Chem. Res.*, 46: 3709-3719 (2007).

(Continued)

*Primary Examiner* — Thai Phan
(74) *Attorney, Agent, or Firm* — Hamilton, Brook, Smith & Reynolds, P.C.

(57) ABSTRACT

A method of designing or optimizing a column for a separation process includes the computer implemented steps of, in a digital processor, providing vapor-side and liquid-side mass transfer coefficient expressions and a mass transfer area expression relevant for a subject column, the vapor-side and liquid-side mass transfer coefficient expressions and the mass transfer area expression having been derived from defining a column average height equivalent to a theoretical plate $\langle HETP \rangle$ ) as a mathematical relationship in which $\langle HETP \rangle$ is proportional to a vapor flow rate, is inversely proportional to effective packing area participating in mass transfer, has a first correction factor with respect to liquid-side mass transfer, and has a second correction factor with respect to vapor-side mass transfer. The expressions are further derived from reducing error of curve fitting $\langle HETP \rangle$ empirical data of various columns by using the defined $\langle HETP \rangle$ to obtain expressions for the vapor-side and liquid-side mass transfer coefficients and mass transfer area. The method also includes using the provided expressions to determine column height and column width configurations of the subject column, and outputting the determined column height and column width configurations of the subject column.

36 Claims, 22 Drawing Sheets

(56) References Cited

OTHER PUBLICATIONS

"Notification of Transmittal of the International Search Report and the Written Opinion of the International Searching Authority, or the Declaration" for International Application No. PCT/US2011/045576, mailed on Dec. 13, 2012.

Peng, J., et al., "Dynamic rate-based and equilibrium models for a packed reactive distillation column," *Chemical Engineering Science*, 58: 2671-2680 (2003).

Notification Concerning Transmittal of International Preliminary Report on Patentability and the Written Opinion of the International Searching Authority, for International Application No. PCT/US2011/045576, Apparatus and Method of Designing or Optimizing a Column for a Separation Process, mailed on Feb. 7, 2013.

Onda, K., et al., "Effect of Packing Materials on the Wetted Surface Area," *Kagaku Kogaku*, 31:126-134 (1967).

Bravo, J.L. and Fair, J.R., "Generalized Correlation for Mass Transfer in Packed Distillation Columns," 21:162-170 (1982).

Billet, R. and Schultes, M., "Prediction of Mass Transfer Columns with Dumped and Arranged Packings: Updated Summary fo the Calculation Method of Billet and Schultes," *Trans IChemE*, 77(A):498-504 (1999).

Bravo, J.L., et al., "Mass Transfer in Gauze Packings," *Hydrocarbon Processing*, 64:91-95 (1985).

Bravo, J.L., et al., "A Comprehensive Model for the Performance of Columns Containing Structured Packings," 128:A489-A507 (1992).

Adler S., et al., "Vision 2020: 2000 Separations Roadmap, "*American Institute of Chemical Engineers*, New York, (2000).

Agrawal, R., et al., "Impact of Low Pressure Drop Structure Packing on Air Distillation," IChemE Symposium Series No. 128: A125-A137 (1992).

Bennett, D.L. and Kovak, K.W. "Optimize Distillation Columns," *Chemical Engineering Progress*, 19-34 (2000).

Bennett, K. and Pilling, M., "Efficiency Benefits of High Performance Structured Packings," *Texas Technology Showcase 2003*. D2: (2003).

Billet, R., "Recent Investigations of Metal Pall Rings" Chemical Engineering Progress, 63(9):53-65 (1967).

Bird, R.B., et al., "Transport Phenomena," $2^{nd}$ edn, New York: John Wiley & Sons, 676-679 (2002).

Bolles, W.L. and Fair, J.R., "Improved Mass-Transfer Model Enhances Packed-Column Design," *Chemical Engineering*, 109-116 (1982).

Bolles, W.L. and Fair, J.R., "Performance and Design of Packed Distillation Columns," IChemE Symposium Series No. 56:35-89 (1979).

Cents, A.H.G. et al., "$CO_2$ Absorption in Carbonate/Bicarbonate Solutions: The Danckwerts-Criterion Revisited," *Chemical Engineering Science*, 60:5830-5835 (2005).

de Brito, M.H., "Gas Absorption Experiments in a Pilot Column with the Sulzer Structured Packing Mellapak," (thesis, Ecole Polytechnique Federale de Lausanne (1991).

de Montigny, D., et al, "Modelling the Performance of a $CO_2$ Absorber Containing Structured Packing," *Industrial and Engineering Chemistry Research*, 45(8):2594-2600 (2006).

Duss, M., et al., "Effective Interfacial Area and Liquid Holdup of Nutter Rings at High Liquid Loads," *Chemical Engineering and Technology*, 24:716-723 (2001).

Fitz, Jr., C.W., et al., "Performance of Structured Packing in a Commercial-Scale Column at Pressures of 0.02-27.6 bar," *Industrial & Engineering Chemistry Research*, 38(2):512-518 (1999).

Gabrielsen, J., et al., "Experimental Validation of a Rate-Based model for $CO_2$ Capture Using an AMP Solution," *Chemical Engineering Science*, 62:2397-2413 (2007).

Gualito, J.J., et al., "Design Method for Distillation Columns Filled with Metallic, Ceramic, or Plastic Structured Packings," *Industrial and Engineering Chemistry Research*, 36: 1747-1757 (1997).

Hanley, B., "Calculation of the HETP at Total Reflux: Generalization of the Fenske Equation," paper presented at the meeting of *AIChE Annual Meeting* (2001).

Kean, J.A., et al., "Structured Packing Proven Superior for TEG Gas Drying," *Oil & Gas Journal*, 41-46 (1991).

Kolev, N., "Packed Bed Columns for Absorption, Desorption, Rectification and Direct Heat Transfer," (London: Elsevier, 2006).

Kolev, N., et al., "Effective Area of a Highly Effective Random Packing," *Chemical Engineering and Processing*, 45:429-436 (2006).

Lawal, A., et al, "Dynamic Modeling of $CO_2$ Absorption for Post Combustion Capture in Coal-Fired Power Plants," *Fuel: 7th European Conference on Coal Research and Its Applications*, 88(12) 2455-2462 (2009).

Ludwig, E.E., "Applied Process Design for Chemical and Petrochemical Plants," vol. 2, $3^{rd}$ edition, Houston: Gulf Professional Publishing (1997).

Murch, D.P., et al., "Height of Equivalent Theoretical Plate in Packed Fractionation Columns," *Industrial & Engineering Chemistry*, 45(12): 2616-2621 (1953).

Nakov, Sv., et al., "Comparison of the Effective Area of Some Highly Effective Packings," *Chemical Engineering and Processing*, 46: 1385-1390 (2007).

Rocha, J.A., et al., "Distillation Columns Containing Structured Packings: A Comprehensive Model for Their Performance. 2. Mass-Transfer Model," *Industrial and Engineering Chemistry Research*, 35:1660-1667(1996).

Rukovena, F., Jr., et al., "Mass Transfer and Hydraulic Details on Intalox PhD Packing," Distillation and Absorption Paper presented at the meeting of the 2002—Proceedings, pp. 6-9.

Schultes, M., "Raschig Super-Ring: A New 4th Generation Packing," *Chemical Engineering Research & Design*, 81:48-57 (2003).

Shiveler, G., et al., "Retrofit of a $H_2S$ Selective Amine Absorber Using MellapakPlus Structured Packing," *Paper presented at the Spring AIChE Meeting*, Atlanta (2005).

Tsai, R.E., et al. "Influence of Surface Tension on Effective Packing Area," *Industrial and Engineering Chemistry Research*, 47(4): 1253-1260 (2008).

Wagner, I., et al, "Mass Transfer in Beds of Modern, High-Efficiency Random Packings," *Industrial and Engineering Chemistry Research*, 36(1):227-237 (1997).

Wang, G.Q., et al., "Review of Mass-Transfer Correlations for Packed Columns," *Industrial and Engineering Chemistry Research*, 44(23):8715-8729 (2005).

Wang, S., et al., "Investigation on Rectifying Characteristics of Two New Tower Packings," Journal of Chemical Industry and Engineering, 41(2):187-194 (1990). (English Abstract).

Zhang, Y., et al., "Rate-Based Process Modeling Study of $CO_2$ Capture with Aqueous Monoethanolamine Solution," *Industrial and Engineering Chemistry Research*, 48(20):9233-9246 (2009).

* cited by examiner

APPARATUS AND METHOD OF DESIGNING OR OPTIMIZING A COLUMN FOR A SEPARATION PROCESS

RELATED APPLICATION

This application claims the benefit of U.S. Provisional Application No. 61/368,498, filed on Jul. 28, 2010. The entire teachings of the above application are incorporated herein by reference.

BACKGROUND OF THE INVENTION

Recently, the American Institute of Chemical Engineers (AIChE), in conjunction with the U.S. Department of Energy (DOE), published *Vision 2020: 2000 Separations Roadmap*. Adler S., Beaver E., Bryan P., Robinson S., Watson J., *Vision 2020: 2000 Separations Roadmap*, American Institute of Chemical Engineers, New York, 2000. This document outlines technical barriers and research needs for the foreseeable future in the areas of adsorption, extraction, crystallization, membranes, bioseparations, and distillation. Prominent among the most important research needs and barriers for distillation are: 1) the need for a better understanding of mass transfer and multiphase flow in both trayed and packed columns, 2) the lack of accurate real stage efficiency models for these types of columns, and 3) the fact that nonequilibrium column models lack accuracy, generality, and ease of use. Rate-based calculations for trayed and packed columns offer process engineers a more rigorous and reliable basis for assessing column performance than the traditional equilibrium stage approach, especially for multicomponent separations. While the mathematics, thermodynamics, and transport-related physics upon which nonequilibrium separations theory is founded are generally true, it is also true that rate-based simulations today suffer from a serious weakness—they are ultimately tied to underlying equipment performance correlations with questionable predictive capability. In the case of packed columns operated countercurrently, correlations are required for the liquid-side and vapor-side mass transfer coefficients, $k_x$ and $k_y$, respectively, for the specific area participating in mass transfer, $a_m$, for the two-phase pressure drop, $(\Delta p/z)_{2\phi}$, and for the flood capacity of the column. In particular, it is generally well-known that packing mass transfer correlations available in the public domain are unreliable when they are applied to chemical systems and column operating conditions outside of those systems and conditions used to develop the correlations in the first place.

Therefore, there is a need for dependable, dimensionally consistent, correlating expressions for the mass transfer related quantities $k_x$, $k_y$, and $a_m$ for packed columns.

SUMMARY OF THE INVENTION

The present invention generally relates to designing or optimizing a column for a separation process by obtaining vapor-side and liquid-side mass transfer coefficient expressions and a mass transfer area expression relevant for a subject column.

In one embodiment, a method of designing or optimizing a column for a separation process includes the computer implemented steps of in a digital processor, providing vapor-side and liquid-side mass transfer coefficient expressions and a mass transfer area expression relevant for a subject column, the vapor-side and liquid-side mass transfer coefficient expressions and the mass transfer area expression having been derived from defining a column average height equivalent to a theoretical plate ($\langle HETP \rangle$) as a mathematical relationship in which $\langle HETP \rangle$ is proportional to a vapor flow rate, is inversely proportional to effective packing area participating in mass transfer, has a first correction factor with respect to liquid-side mass transfer, and has a second correction factor with respect to vapor-side mass transfer. The expressions are further derived from reducing error of curve fitting $\langle HETP \rangle$ empirical data of various columns by using the defined $\langle HETP \rangle$ to obtain expressions for the vapor-side and liquid-side mass transfer coefficients and mass transfer area. The method also includes using the provided expressions to determine column height and column width configurations of the subject column, and outputting the determined column height and column width configurations of the subject column.

In some embodiments, the subject column is an existing column, and the determined column height and column width configurations are used for rating performance of the subject column. In certain embodiments, the $\langle HETP \rangle$ empirical data are data from separation processes employing members of a packing family. In some embodiments, the first correction factor $C_x$ and the second correction factor $C_y$ are each dependent on composition at the top of the column and composition at the bottom of the column. In a specific embodiment, the relationship defining $\langle HETP \rangle$ is dimensionally consistent. In another specific embodiment, the step of defining $\langle HETP \rangle$ as a mathematical relationship includes identifying plural physical quantities on which the liquid-side and vapor-side mass transfer coefficients and mass transfer area depend. The physical quantities on which the liquid-side mass transfer coefficient depends include liquid velocity, liquid density, liquid viscosity, liquid-phase molar concentration, liquid-phase binary diffusivity, and equivalent diameter. The physical quantities on which the vapor-side mass transfer coefficient depends include vapor velocity, vapor density, vapor viscosity, vapor-phase molar concentration, vapor-phase binary diffusivity, and equivalent diameter. The physical quantities on which the mass transfer area depends include vapor density, vapor viscosity, vapor velocity, liquid density, liquid viscosity, liquid velocity, surface tension, equivalent diameter, and acceleration due to gravity.

In some embodiments, the mathematical relationship defining $\langle HETP \rangle$ depends on the parameters A, B, X, $\Delta$, E, $\Phi$, $A'_M$, and $A'_V$. These parameters can be obtained by performing least squares regression on vapor-phase-controlled empirical data, and, using liquid-phase-controlled empirical data, comparing the calculated column temperature profile and calculated column performance to the empirical data and adjusting a front factor $A_L$ (wherein $A'_M = A_M A_L$ and $A'_V = A_V/A_L$) on the liquid-side mass transfer correlation to fit the liquid-phase-controlled empirical data while maintaining quality of fit to the $\langle HETP \rangle$ empirical data. The vapor-phase-controlled empirical data can be $\langle HETP \rangle$ data from distillation processes. The liquid-phase-controlled empirical data can include liquid-phase-controlled gas absorption data and liquid stripping data. Liquid-phase-controlled gas absorption data can include carbon dioxide absorption data and chlorine absorption data. The column performance can be the calculated liquid loading and the calculated percent removal from the vapor. Liquid stripping data can include removal of oxygen from water and removal of hydrogen sulfide from an acidic solution.

In another embodiment, a computer apparatus for designing or optimizing a column for a separation process includes a digital processor member having vapor-side and liquid-side mass transfer coefficient expressions and a mass transfer area expression relevant for a subject column. The computer apparatus further includes a processing unit operatively coupled to the digital processor member, the processing unit using the expressions to determine column height and column width configurations of the subject column, and an output module coupled to receive the determined column width and column height configurations and providing an indication of the determined configurations of the subject column as output.

This invention has many advantages including more accurate mass transfer expressions that enable optimization and design of packed columns for separation processes.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

FIG. 10(a) Data of Wang, et al., for total reflux distillation of benzene/toluene at 760 torr; FIG. 10(b) Performance data for IMTP 40 random packing in ethylbenzene/styrene service; FIG. 10(c) Data of Wagner, et al., for total reflux distillation of cyclohexane/n-heptane at 250 torr; FIG. 10(d) Data of Wang, et al., for total reflux distillation of carbon tetrachloride/benzene at 760 torr. Correlations used in these calculations: Bravo and Fair, Onda, et al., and Billet and Schultes.

FIG. 11(a) Data of Fitz and others for total reflux distillation of cyclohexane/n-heptane at 5 psia; FIG. 11(b) Data of Fitz and others for total reflux distillation of cyclohexane/n-heptane at 5 psia; FIG. 11(c) Data from Schultes for total reflux distillation of i-butane/n-butane at 165 psia; FIG. 11(d) Data of Fitz and others for total reflux distillation of cyclohexane/n-heptane at 5 psia. Correlations used in these calculations: Bravo and Fair, Onda, et al., and Billet and Schultes.

FIG. 12(a) Data of Fitz and others, for total reflux distillation of cyclohexane/n-heptane at 5 psia. Simulations performed with the NRTL property package; FIG. 12(b) Data reported by Bennett and Pilling for total reflux distillation of chlorobenzene/ethylbenzene at 75 torr. Simulations performed with the NRTL property package; FIG. 12(c) Data of Agrawal, et al., for the total reflux distillation of argon/oxygen at 30 psia. Simulations performed with the REFPROP property package; FIG. 12(d) Data of Fitz and others for total reflux distillation of cyclohexane/n-heptane at 5 psia. Simulations performed with the NRTL property package. Correlations used in this work: Bravo, Rocha, and Fair 1985 (BRF85), Bravo, Rocha, and Fair 1992 (BRF92), and Billet and Schultes.

FIGS. 15(a)-(c) are graphs of: FIG. 15(a) Comparison of the data of Shiveler, et al., (-•-) for the $CO_2/H_2S$ selectivity of the outlet flue gas stream with the predicted selectivities calculated using the BRF85 mass transfer correlation and the correlation presented here for MELLAPAK structured packings. The A, B, and C labels refer to the three design cases studied by the authors; FIG. 15(b) comparison of the calculated $CO_2$ profiles for the three different design cases; FIG. 15(c) comparison of the calculated $H_2S$ profiles for the three different design cases.

FIGS. 17(a)-(b) are graphs of: FIG. 17(a) correlation predictions for the fractional mass transfer area of MELLAPAK 250Y versus vapor corrected superficial vapor velocity, $C_S$, for the total reflux distillation of chlorobenzene/ethylbenzene at 75 torr; FIG. 17(b) correlation predictions for the fractional mass transfer area of MELLAPAK 250Y versus vapor corrected superficial vapor velocity, $C_S$, for the total reflux distillation of chlorobenzene/ethylbenzene at 760 torr. Correlations used in these calculations: Onda, et al., Bravo, Rocha, and Fair 1992 (BRF92), and de Brito.

FIGS. 18(a)-(b) are graphs of: FIG. 18(a) the mass transfer area of IMTP 40—deduced by Nakov, et al., from analysis of data on the absorption of $CO_2$ into caustic by the method of Danckwerts—compared with mass transfer area predictions for several correlations; FIG. 18(b) the mass transfer area of IMTP 25—deduced by Nakov, et al., from analysis of data on the absorption of $CO_2$ into caustic by the method of Danckwerts—compared with mass transfer area predictions for several correlations. Correlations used in these calculations: Bravo and Fair, and Onda, et al.

FIGS. 19(a)-(b) are graphs of: FIG. 19(a) the mass transfer area of Nutter ring #1.75—deduced by Duss, et al., from analysis of data on the absorption of $CO_2$ into caustic by the method of Danckwerts—compared with mass transfer area predictions for several correlations; FIG. 19(b) the mass transfer area of Nutter ring #1—deduced by Duss, et al., from analysis of data on the absorption of $CO_2$ into caustic by the method of Danckwerts—compared with mass transfer area predictions for several correlations. Correlations used in these calculations: Bravo and Fair, and Onda, et al.

DETAILED DESCRIPTION OF THE INVENTION

Figure 1A:
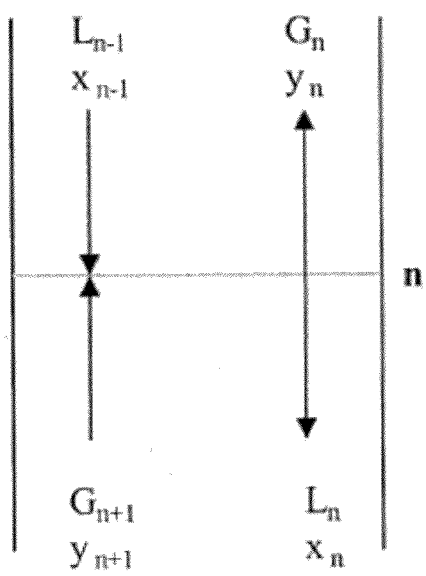
FIGS. 1(a)-(b) are diagrams showing the changing driving force for mass transfer between the operating line and the equilibrium curve.

A description of example embodiments of the invention follows.

In one embodiment, a method of designing or optimizing a column for a separation process includes the computer implemented steps of, in a digital processor, providing vapor-side and liquid-side mass transfer coefficient expressions and a mass transfer area expression relevant for a subject column, the vapor-side and liquid-side mass transfer coefficient expressions and the mass transfer area expression having been derived from defining a column average height equivalent to a theoretical plate ($\langle HETP \rangle$) as a mathematical relationship in which $\langle HETP \rangle$ is proportional to a vapor flow rate, is inversely proportional to effective packing area participating in mass transfer, has a first correction factor with respect to liquid-side mass transfer, and has a second correction factor with respect to vapor-side mass transfer. The development of mass transfer expressions below uses the terms expressions and correlations interchangeably.

Applicant begins by reviewing the performance of a few of the more commonly used packed column mass transfer correlations when they are used to predict the $\langle HETP \rangle$ for binary separations. The $\langle HETP \rangle$ function for binary systems is particularly important to the development of packing mass transfer correlations because it ties the separation performance of a tower expressed in terms of equilibrium stages to that column's performance expressed in terms of a rate-based differential contactor. In particular, Applicant focuses on several packed column mass transfer/interfacial area correlations found in commercially available column simulation software like Aspen Technology's Aspen Rate Based Distillation component: the equations of Onda, Takeuchi and Koyama (hereafter referred to as Onda, et al.), Bravo and Fair (hereafter referred to as BF82), and Billet and Schultes for random packings, the correlation of Bravo, Rocha, and Fair for wire gauze structured packings (hereafter referred to as BRF85), and the correlations of Bravo, Rocha, and Fair (hereafter referred to as BRF92), and of Billet and Schultes for sheet metal structured packings. Aspen Technology, Inc., Burlington, Mass.; K. Onda, H. Takeuchi and Y. Koyama, 'Effect of Packing Materials on the Wetted Surface Area', Kagaku Kogaku, 31 (1967), 126-34; J. L. Bravo and J. R. Fair, 'Generalized Correlation for Mass Transfer in Packed Distillation Columns', Industrial & Engineering Chemistry Process Design and Development, 21 (1982), 162-70 (BRF82); R. Billett and M. Schultes, 'Prediction of Mass Transfer Columns with Dumped and Arranged Packings: Updated Summary of the Calculation Method of Billett and Schultes', Transactions of the Institution of Chemical Engineers, 77(A) (1999), 498-504 (hereafter referred to as Billet and Schultes 1999); J. L. Bravo, J. A. Rocha and J. R. Fair, 'Mass Transfer in Gauze Packings', Hydrocarbon Processing, 64 (1985), 91 (BRF85); J. L. Bravo, J. A. Rocha and J. R. Fair, 'A Comprehensive Model for the Performance of Columns Containing Structured Packings', 128 (1992), A489 (BRF92). Table 1 below is such a comparison for binary distillation experiments with random packings. H. Z. Kister, Distillation Design (New York: McGraw-Hill, 1992); M. Schultes, 'Raschig Super-Ring: A New 4th Generation Packing', Chemical Engineering Research & Design, 81 (2003), 48-57.

TABLE 1

Results for binary distillation experiments with random packings.

| System | Pressure (torr) | Packing | $\langle HETP \rangle$ (Billet) | $\langle HETP \rangle$ (BF82) | $\langle HETP \rangle$ (Onda) | $\langle HETP \rangle$ (Aspen) | $\langle HETP \rangle$ (Expt) |
|---|---|---|---|---|---|---|---|
| $C_6$/n-$C_7$ | 760 | 2" Pall ring | 43.2 | 25.4 | 71.1 | 58.4 | 63-71 [a] |
| 1,2PG/EG | 10 | 2" Pall ring | 63.5 | 86.4 | 142.2 | 106.7 | 96.5 [a] |
| EB/SM | 100 | 3½" Pall | 63.5 | 63.5 | 142.2 | 55.9 | 73.7 [a] |
| EB/SM | 100 | 1½" Pall | 58.4 | 25.4 | 43.2 | 45.8 | 40-48 [a] |
| EB/SM | 100 | ⅝" Pall ring | 40.6 | 15.2 | 19 | 33 | 28-38 [a] |
| p/o-xylene | 50 | ⅝"Pall ring | 40.6 | 20.3 | 17.1 | 33 | 35-38 [a] |
| i-$C_4$/n-$C_4$ | 8533 | 2" Pall ring | 16.5 | 25.4 | 53.3 | 48.3 | 51 [b] |
| i-octane/tol | 760 | 1" Pall ring | 24.6 | 14 | 21.3 | 39.9 | 40.6 [a] |
| i-octane/tol | 760 | 2" Pall ring | 33 | 28 | 49.5 | 50 | 66-71 [a] |
| $D_2O$/$H_2O$ | 350 | HY-PAK #1 | 64.8 | 14 | 30.5 | 34.8 | 48.2 [a] |

Experimental results shown in Table 1 are from Kister [a] and Schultes [b]. In all cases the countercurrent flow model was used. All experiments were conducted at total reflux. $\langle HETP \rangle$ s are reported in cm. Abbreviations—PG: propylene glycol, EG: ethylene glycol, EB: ethylbenzene, SM: styrene. For each experimental system, Applicant has calculated $\langle HETP \rangle$ s using the mass transfer correlations for random packings listed above (Billet; BF82, and Onda). Since most distillations are primarily vapor-phase-controlled, the results in the table can be considered tests of the robustness of each correlation's $k_v a_m$ predictions (Applicant expects $K_{Ov} \cong k_v$ for such systems, as described below). Calculated $\langle HETP \rangle$ s more than 20% different from the measured value range are bolded and underlined in Table 1.

Table 2 below is a similar comparison for structured packings. C. W. Fitz, J. G. Kunesh and A. Shariat, 'Performance of Structured Packing in a Commercial-Scale Column at Pressures of 0.02-27.6 bar', Industrial & Engineering Chemistry Research, 38 (1999), 512-18; R. Agrawal and others, 'Impact of Low Pressure prop Structure Packing on Air Distillation', in Distillation and Absorption: IChemE Symposium Series 128 (1992), CXXVIII, A125; J. A. Kean, H. M. Turner and B. C. Price, 'Structured Packing Proven Superior for TEG Gas Drying', Oil & Gas Journal, 1991, 41-46.

TABLE 2

Results for structured packings

| System | Pressure (torr) | Packing | ⟨HETP⟩ (Billet) | ⟨HETP⟩ (BRF85) | ⟨HETP⟩ (BF92) | ⟨HETP⟩ (Aspen) | ⟨HETP⟩ (Expt) |
|---|---|---|---|---|---|---|---|
| Ar/O$_2$ | 1550 | Flexipac 500Y | 15.6 | 19.1 | __22.1__ | 17.6 | 17.5[d] |
| p/o-xylene | 16 | Mellapak 250Y | 38.1 | 35.6 | __50.8__ | __43.2__ | 33.0[c] |
| p/o-xylene | 100 | Flexipac 700Y | 23.6 | __9.1__ | __14.7__ | 17.3 | 20.3[c] |
| CB/EB | 76 | Mellapak 350Y | 29.2 | 24.8 | __33.0__ | 27.4 | 26.7[a] |
| CB/EB | 76 | Mellapak 500Y | __30.5__ | 27.9 | 27.9 | 22.4 | 22.9[a] |
| i-C4/n-C4 | 8533 | Mellapak 250Y | __11.9__ | 31.8 | 25.4 | 24.1 | 21.6-31[c] |
| C$_6$/n-C$_7$ | 1241 | Flexipac 250Y | __21.8__ | 40.6 | 35.6 | 30.5 | 38-41[c] |
| cis-/trans-decalin | 304 | Mellapak 250Y | __24.1__ | 41.9 | 39.4 | 38.1 | 33-35.6[a] |
| TEG/H$_2$O/CH$_4$ | 31030 | Flexipac 250Y | __472.4__ | __348.0__ | __1193.8__ | 140 | 167.6[e] |

Experimental results from Kister[a], Fitz[c], et al., Agrawal[d], et al., and Kean[e], et al. In all cases the countercurrent flow model was used. All experiments were conducted at total reflux. ⟨HETP⟩ s are reported in cm. Abbreviations—CB: chlorobenzene, EB: ethylbenzene, TEG: triethylene glycol. Once again, calculated HETPs more than 20% different than the measured value range are bolded and underlined in Table 2. In Table 1, ⅔ of the calculated ⟨HETP⟩ s for random packings are more than 20% above or below the experimental values. In Table 2, about 40% of the predicted ⟨HETP⟩ s for structured packings are outside the ±20% envelope. These results demonstrate that results generated during a rate-based simulation will very often be limited by the reliability of the auxiliary mass/heat transfer correlations needed to complete the mathematical description of the packed tower. In the development below, the ⟨HETP⟩ empirical data can be data from separation processes employing members of a packing family. A packing family includes geometrically similar packings. Two objects are geometrically similar when one object is congruent to the other as a result of a uniform scaling (enlarging or shrinking), possibly with additional rotation and reflection; i.e., both have the same shape, or one has the same shape as a rotated version of the other. This should not be taken as absolute, however. For example, if a packing is made of a wire mesh, the manufacturer doesn't change the wire size in the mesh when changing the size of the packing. What is changed is the size of the packing element which is composed of the same size wire underneath it all (in other words the geometry when looking at the object from a distance has changed). On close inspection, however, the wire size has not been changed. A packing family also includes packings that are geometrically similar and also chemically similar, that is, chemically similar packing families include metals, plastics, ceramics, and carbon.

Mathematical Preliminaries

Before turning to the development of specific mass transfer correlations for random and structured packings, Applicant will first discuss several preliminary topics of interest here, primarily related to the proper interpretation of binary mass transfer experiments using standard test mixtures.

The Point HETP

The defining expression for the point HETP in a packed tower is developed by treating the packed tower as an equilibrium stage contactor and then doing a mass balance over a single equilibrium stage. Normally, it is assumed that the major resistance to mass transfer resides in the vapor phase. Further, the development assumes that the equilibrium curve for the stage in question is straight for the composition changes encountered on the stage. For the sake of simplicity, we will assume here that constant molal overflow is true throughout the column. The assumption of constant molal overflow is almost always acceptable for analyzing binary distillation experiments with standard test mixtures that have small relative volatilities, $\alpha$. The development below is strictly valid for binary systems. The equilibrium stage concept is incompatible with the rate theory for mass transfer in multicomponent systems, although it is applicable to multicomponent systems that can be approximated as pseudo-binary systems.

Figure 1B:
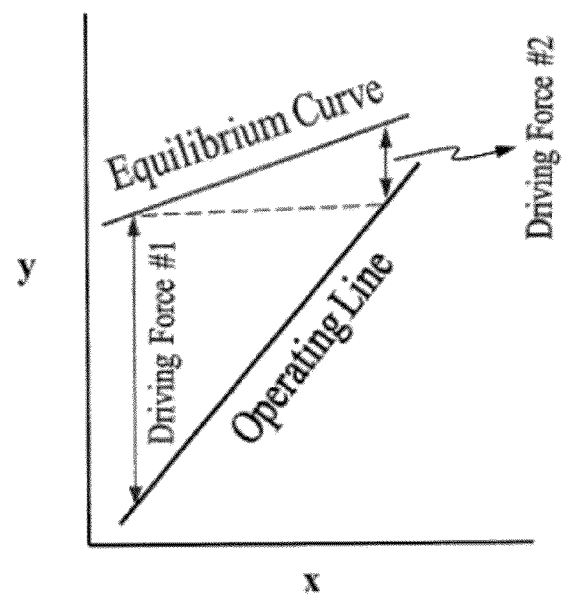

Consider the diagrams in FIGS. 1(a)-(b). Note that there is a continuously changing overall driving force for mass transfer. Where it is possible to assume that the equilibrium curve is linear over the range in which it is to be used, it can be shown that the logarithmic mean of the terminal potentials accounts for the continuously changing driving force exactly.

The amount of the more volatile component (referred to as component "A") transferred from the vapor to the liquid phase per unit area (i.e., the flux of the more volatile component) is:

$$N_A = G(y_n - y_{n+1}) \tag{1}$$

where G is the molar flux of vapor in the column (assumed constant in the packed section because of constant molal overflow).

With the assumption that the equilibrium curve is straight:

$$G(y_n - y_{n+1}) = (K_{Oy} a_m)\bigg|_n \left[ HETP_n \left( \frac{(y_n - y_{n+1}) - (y_{n-1} - y_n)}{\ln\left[\frac{y_n - y_{n+1}}{y_{n-1} - y_n}\right]} \right) \right] \tag{2}$$

$K_{Oy} a_m |_n$ is the product of the overall mass transfer coefficient based on the vapor phase with the area involved in mass transfer per unit volume on stage "n", and $HETP_n$ is the packed depth corresponding to theoretical plate "n". This expression can be rearranged to:

$$G = (K_{Oy}a_m)\bigg|_n \left( HETP_n \left( \frac{1 - \frac{(y_{n-1} - y_n)}{(y_n - y_{n+1})}}{\ln\left[\frac{y_n - y_{n+1}}{y_{n-1} - y_n}\right]} \right) \right) \quad (3)$$

It can be shown that:

$$\frac{y_n - y_{n+1}}{y_{n-1} - y_n} = \frac{L}{m_n G} \quad (4)$$

Substituting $$G = (K_{Oy}a_m)\bigg|_n \left( HETP_n \left( \frac{1 - \frac{m_n G}{L}}{\ln\left[\frac{m_n G}{L}\right]} \right) \right) \quad (5)$$

Further, if we define $\lambda_n = m_n G/L$, then:

$$HETP_n = \frac{G}{(K_{Oy}a)|_n} \left( \frac{\ln \lambda_n}{\lambda_n - 1} \right) \quad (6)$$

Figure 2:
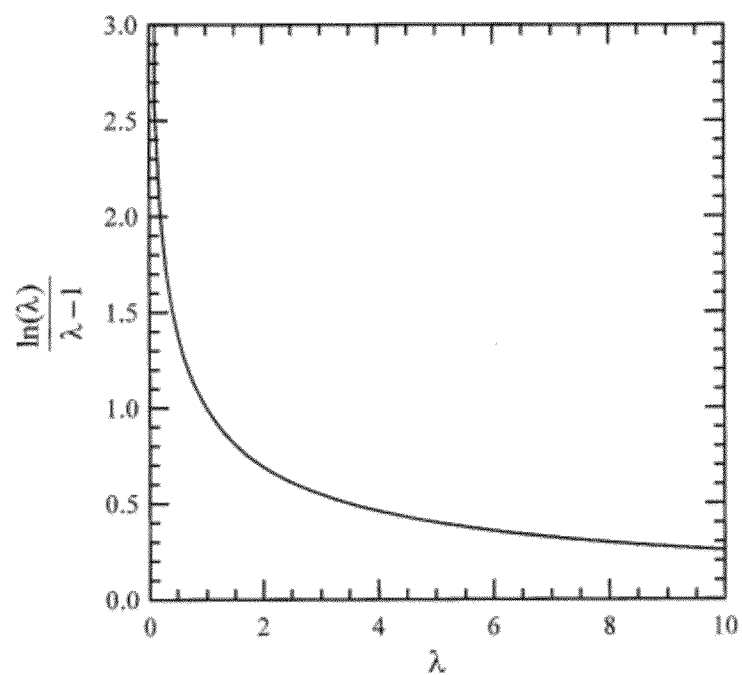
FIG. 2 is a graph of a factor relating the HETP to the HTU, $\ln(\lambda)/(\lambda-1)$, as a function of $\lambda$.

This is the final expression for the HETP at stage "n"—$HETP_n$. $\lambda_n$ can be considered a sort of stripping factor. The notation above—$HETP_n$, $K_{Oy}a|_n$, and $\lambda_n$—implies that these quantities are dependent on the stage number, n, while G is not (because of the assumption of constant molal overflow). FIG. 2 shows how $\ln(\lambda)/(\lambda-1)$ varies with $\lambda$. Clearly, the variation in the value of $HETP_n$ can be greatly affected by $\lambda_n$ as one moves from stage to stage. Therefore, $\lambda$ has a great impact on the economics of any separation.

In order to calculate the packed depth required to accomplish a given level of separation, one must perform the sum shown below:

$$Z = \sum_{n=1}^{N} HETP_n = G \sum_{n=1}^{N} \frac{1}{(K_{Oy}a_m)|_n} \left( \frac{\ln \lambda_n}{(\lambda_n - 1)} \right) \quad (7)$$

The simple appearance of this formula is deceptive. A significant amount of computational effort is required for each stage. In practice, this calculation is seldom, if ever, done.

The Average HETP

The usual experimental method for measuring the efficiency of a packed section involves the calculation of a rather different HETP: the packed section, or average, HETP. This is defined as:

$$\langle HETP \rangle = \frac{Z}{N} = \frac{1}{N} \sum_{n=1}^{N} HETP_n = \frac{G}{N} \sum_{n=1}^{N} \frac{1}{(K_{Oy}a_m)|_n} \left( \frac{\ln \lambda_n}{(\lambda_n - 1)} \right) \quad (8)$$

The average HETP—$\langle HETP \rangle$—has the advantage of being easy to calculate from experimental data. However, it is clearly not the same as the point HETP. The two are related in that the packed section HETP is the average value of the individual point HETPs.

Usually, it is the average HETP for a packed section that is reported. The variation of these average HETPs with vapor and liquid loadings, system physical properties, packing topology, and packed depth, are then usually modeled with the equations developed for the point HETP. In order to use the point HETP equation and apply it to average HETP data, one must calculate the sum in equation (8). This calculation is almost never performed. Rather, the average HETP is taken to be:

$$\langle HETP \rangle = \frac{G}{\langle K_{Oy}a_m \rangle} \left( \frac{\ln \bar{\lambda}}{\bar{\lambda} - 1} \right) \quad (9)$$

where $\bar{\lambda}$ ($=\bar{m}$ at total reflux) is some type of average value whose value or method of calculation is rarely reported. BRF85; W. L. Bolles and J. R. Fair, 'Improved Mass-Transfer Model Enhances Packed-Column Design', Chemical Engineering, 1982, 109-16.

Clearly:

$$\frac{\ln \bar{\lambda}}{\langle K_{Oy}a_m \rangle(\bar{\lambda} - 1)} \neq \frac{1}{N} \sum_{n=1}^{N} \frac{\ln(\lambda_n)}{(K_{Oy}a_m)|_{m_n}(\lambda_n - 1)} \quad (10)$$

It is also generally true that:

$$\frac{\ln \bar{\lambda}}{(\bar{\lambda} - 1)} \neq \frac{1}{N} \sum_{n=1}^{N} \frac{\ln(\lambda_n)}{(\lambda_n - 1)} \quad (11)$$

Reconciling the HETP Definitions

The above description of the two different HETP definitions in use shows that the sum $$\frac{1}{N} \sum_{n=1}^{N} \frac{\ln(\lambda_n)}{(K_{Oy}a_m)|_{m_n}(\lambda_n - 1)} \quad (12)$$

must be performed in order to apply the point HETP definition to average HETP data usually reported. This is a challenging task. To illustrate the experimental and computational complexity implied in this sum, let us consider rectification at total reflux (i.e. $\lambda_n = m_n$) of a binary pair where the relative volatility, $\alpha$, over the entire composition spectrum is constant. First, the total number of stages needs to be determined from the experimental composition data recorded at the bottom and the top of the packed section. The number of stages can be calculated with the Fenske equation:

$$N = \frac{\ln\left(\frac{x_t(1 - x_b)}{x_b(1 - x_t)}\right)}{\ln(\alpha)} - 1 \quad (13)$$

Note that reboilers are usually treated as ideal stages; hence one equilibrium stage is usually subtracted from the stage count for the entire column so that the number of stages relates only to those generated by the column internals. Next, one must enumerate the compositions at every stage. Starting at the top of the packed section, one next calculates the composition at stage 1 (numbering stages from the top down):

$$1 = \frac{\ln\left(\frac{x_t(1-x_1)}{x_1(1-x_t)}\right)}{\ln(\alpha)} \quad (14)$$

One proceeds down the column until one reaches the bottom composition:

$$1 = \frac{\ln\left(\frac{x_1(1-x_2)}{x_2(1-x_1)}\right)}{\ln(\alpha)} \quad (15)$$

$$= \frac{\ln\left(\frac{x_2(1-x_3)}{x_3(1-x_2)}\right)}{\ln(\alpha)} = \ldots = \frac{\ln\left(\frac{x_{N-1}(1-x_N)}{x_N(1-x_{N-1})}\right)}{\ln(\alpha)}$$

The vapor mole fractions in equilibrium with the set of liquid mole fractions just enumerated can be found from:

$$y^* = \frac{\alpha x}{1+(\alpha-1)x} \quad (16)$$

Then the average slope of the equilibrium curve for each stage must be calculated from $$m_n = \frac{y_n^* - y_{n-1}^*}{x_n - x_{n-1}} \quad (17)$$

$$y^* = F(x, P)$$

Finally, the overall mass transfer coefficient must be calculated at each stage from:

$$\frac{1}{K_{Oy}a_m|_n} = \frac{1}{k_ya_m|_n} + \frac{m_n}{k_xa_m|_n} \quad (18)$$

With this, all of the information necessary to compute the necessary summation is available. This procedure involves a great deal of calculation.

If the number of stages is large enough and the variation in the local binary relative volatility is not too severe, then a good approximation can be made to the summation in equation (8) by replacing it with an integral. Note that it is less disturbing to do this with a packed column where it is easier to imagine the composition being continuous with packed depth. B. Hanley, 'Calculation of the HETP at Total Reflux: Generalization of the Fenske Equation', in 2001 AIChE Annual Meeting (Reno, 2001). If one considers a small composition change over a small increment in stage number, then it is easy to show from the Fenske equation that:

$$\frac{dn}{dx} = \frac{1}{x(1-x)\ln[\alpha(x)]} \quad (19)$$

Equation (19) was derived assuming that the relative volatility can be considered constant during the differentiation but then replaced with the compositionally dependent α after the differentiation, Thus, $$\int_0^{N+1} dn = N+1 \cong \int_{x_b}^{x_t} \frac{dx}{x(1-x)\ln[\alpha(x)]} \quad (20)$$

or, for any two stages in the column $$\int_{n_j}^{n_i} dn = n_i - n_j \cong \int_{x_b}^{x_t} \frac{dx}{x(1-x)\ln[\alpha(x)]} \quad (21)$$

Note that the restriction of the Fenske equation to constant relative volatility has been removed.

Next, the packed height calculation can be approximated:

$$Z = \int_{N+1}^0 HETP(n)dn \quad (22)$$

$$= \int_{x_b}^{x_t} HETP(x)\frac{dn}{dx}dx$$

$$\cong G\int_{x_b}^{x_t}\left(\frac{1}{k_ya_m} + \frac{m(x)}{k_xa_m}\right)\left(\frac{1}{x(1-x)\ln[\alpha(x)]}\right)\frac{\ln[m(x)]}{m(x)-1}dx$$

Thus, $$\langle HETP\rangle = \frac{Z}{N} \cong G\frac{\int_{x_b}^{x_t}\left(\frac{1}{k_ya_m}\right)\left(\frac{1}{x(1-x)\ln[\alpha(x)]}\right)\frac{\ln[m(x)]}{m(x)-1}dx}{\int_{x_b}^{x_t}\frac{dx}{x(1-x)\ln[\alpha(x)]}} + \quad (23)$$

$$G\frac{\int_{x_b}^{x_t}\left(\frac{1}{k_xa_m}\right)\left(\frac{m(x)}{x(1-x)\ln[\alpha(x)]}\right)\frac{\ln[m(x)]}{m(x)-1}dx}{\int_{x_b}^{x_t}\frac{dx}{x(1-x)\ln[\alpha(x)]}} \quad \text{where}$$

$$m(x) = \frac{\alpha(x)}{(1+[\alpha(x)-1]x)^2} \quad (24)$$

Note that Applicant has ignored terms involving $d\alpha/dx$ in the derivation of equation (24) from equation (16). For the standard distillation systems studied in most laboratories, the variation of the relative volatility with composition is small and the neglect of these terms has negligible impact.

Applicant now assumes that the terms $k_ya$ and $k_xa$ vary only slightly over the length of bed in question and that they can be withdrawn from their respective integrals and replaced by an average value for the length of bed in question. Then:

$$\langle HETP\rangle = \frac{Z}{N} = G\left(\frac{C_y}{k_ya_m} + \frac{C_x}{k_xa_m}\right) \quad (25)$$

where $$C_y = \frac{\int_{x_b}^{x_t}\left(\frac{1}{x(1-x)\ln[\alpha(x)]}\right)\frac{\ln[m(x)]}{m(x)-1}dx}{\int_{x_b}^{x_t}\frac{dx}{x(1-x)\ln[\alpha(x)]}} = \left\langle\frac{\ln[m(x)]}{m(x)-1}\right\rangle \quad (26)$$

$$C_x = \frac{\int_{x_b}^{x_t}\left(\frac{m(x)}{x(1-x)\ln[\alpha(x)]}\right)\frac{\ln[m(x)]}{m(x)-1}dx}{\int_{x_b}^{x_t}\frac{dx}{x(1-x)\ln[\alpha(x)]}} = \left\langle\frac{m(x)\ln[m(x)]}{m(x)-1}\right\rangle \quad (27)$$

-continued $$\langle HETP \rangle = \frac{Z}{N} = \frac{G}{a_m}\left(\frac{C_y}{k_y} + \frac{C_x}{k_x}\right) \quad (28)$$

While the calculations look overwhelming, they are actually quite easy to perform numerically—in fact, these integrals are substantially easier to evaluate than the sums discussed earlier. Further, there is no restriction on these equations to constant relative volatility.

Figure 3A:
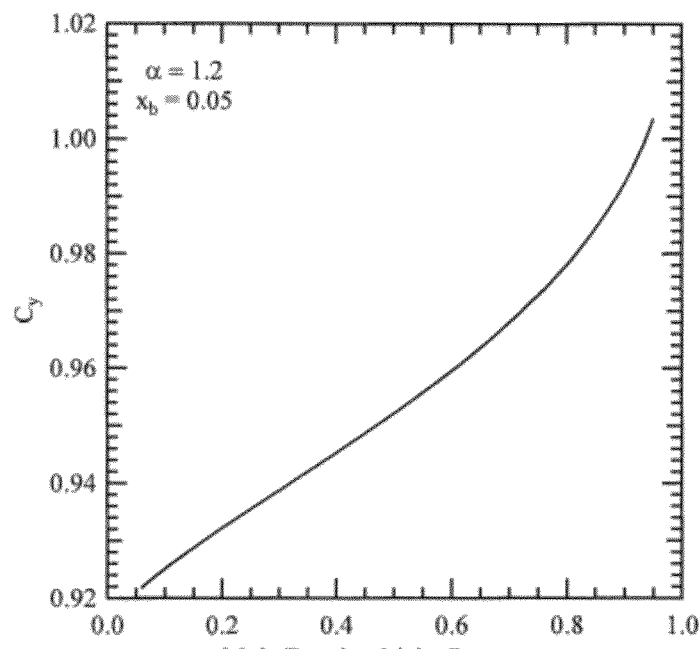
FIGS. 3(a)-(b) are graphs of vapor-side and liquid-side composition correction factors appearing in equation (25) for $\langle HETP \rangle$ for a fictitious binary mixture with $\alpha=1.2$ and the bottom composition fixed at $x_b=0.05$.
Figure 3B:
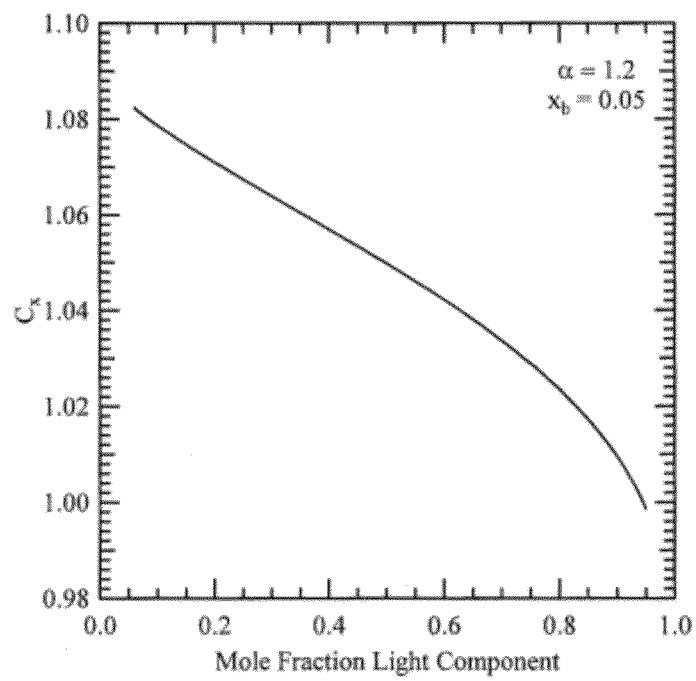

Even without evaluating these integrals, some important conclusions can be drawn. First, note that $C_y$ and $C_x$, and therefore $\langle HETP \rangle$ now depend explicitly on the bottom and top compositions. So, it is not enough to just report $\langle HETP \rangle$, one must also report the top and bottom compositions as well. Second, since the bottom and top compositions depend on the packed depth, one should expect to see that $\langle HETP \rangle$ is packed depth dependent. Indeed, this is oftentimes observed and the effect is sometimes even included in packed column mass transfer correlations. R. Billet, 'Recent Investigations of Metal Pall Rings', Chemical Engineering Progress, 63 (1967), 53; J. J. Gualito and others, 'Design Method for Distillation Columns Filled with Metallic, Ceramic, or Plastic Structured Packings', Industrial and Engineering Chemistry Research, 36 (1997), 1747-57; D. P. Murch, 'Height of Equivalent Theoretical Plate in Packed Fractionation Columns', Industrial & Engineering Chemistry, 45, 2616-2621; W. L. Bolles and J. R. Fair, 'Performance and Design of Packed Distillation Columns', IChemE Symposium Series 56, 1979, 35-89. FIGS. 3(a)-(b) show how $C_y$ and $C_x$ vary with the mole fraction of the light component for a fictitious binary mixture with $\alpha=1.2$ and the bottom composition fixed at $x_b=0.05$.

Dimensional Analysis

First Applicant considers expressions for the mass transfer coefficients $$k_y = K_y(v_V, \rho_V, \mu_V, c_V, D_V, d_e) \quad (29)$$

$$k_x = K_x(v_L, \rho_L, \mu_L, c_L, D_L, d_e) \quad (30)$$

In each case Applicant has assumed that there are six quantities with physical dimensions on which the vapor-side and liquid-side mass transfer coefficients, $k_y$ and $k_x$, respectively, depend. The vapor-side mass transfer coefficient, $k_y$, depends on vapor velocity, $v_V$, vapor density, $\rho_V$, vapor viscosity, $\mu_V$, vapor-phase molar concentration, $c_V$, vapor-phase binary diffusivity, $D_V$, and equivalent diameter, $d_e$. The liquid-side mass transfer coefficient, $k_x$, depends on liquid velocity, $v_L$, liquid density, $\rho_L$, liquid viscosity, $\mu_L$, liquid-phase molar concentration, $c_L$, liquid-phase binary diffusivity, $D_L$, and equivalent diameter, $d_e$. Further, Applicant notes that there are four units of dimension in the relationships above (mass, length, time, and mole number). By the Buckingham Π theorem a relationship exists among three dimensionless groupings. It is straightforward to show in each case that the Sherwood number can be taken to depend on the Reynolds number and the Schmidt number.

$$Sh_v = \frac{k_y d_e}{c_V D_V} = A_V Re_v^m Sc_v^n \quad (31)$$

$$Sh_L = \frac{k_x d_e}{c_L D_L} = A_L Re_L^b Sc_L^c \quad (32)$$

These dimensionless expressions are the expressions for the mass transfer coefficients that will be used herein.

Next, consider the fractional mass transfer area, $a_m/a_d$. Assuming that the fractional mass transfer area in a packed tower is a function of the following physical quantities (vapor density, $\rho_V$, vapor viscosity, $\mu_V$, vapor velocity, $v_V$, liquid density, $\rho_L$, liquid viscosity, $\mu_L$, liquid velocity, $v_L$, surface tension, $\sigma$, equivalent diameter, $d_e$, and acceleration due to gravity, g):

$$\frac{a_m}{a_d} = F(\rho_V, \mu_V, v_V, \rho_L, \mu_L, v_L, \sigma, d_e, g) \quad (33)$$

$$\rho \to \frac{m}{l^3}$$

$$\mu \to \frac{m}{1-t}$$

$$\sigma \to \frac{m}{t^2}$$

$$v \to \frac{l}{t}$$

$$d_e \to 1$$

$$g \to \frac{1}{t^2}$$

Because there are nine quantities with physical dimensions and three units of dimension (mass, length, time), the fractional mass transfer area will be a function of six dimensionless groupings, and therefore the relationship defining $\langle HETP \rangle$ is dimensionally consistent. In one method for finding the dimensionless groupings, Applicant assumes that the functional form for $a_m/a_d$ is a power law. Doing so enables writing down a set of linear equations relating the power law exponents on the various physical quantities.

$$\frac{a_m}{a_d} \propto (\rho_V)^\alpha (\mu_V)^\beta (V_V)^\chi (\rho_L)^\delta (\mu_L)^\epsilon (V_L)^\phi (\sigma)^\gamma (d_e)^\eta (g)^\iota \quad (34)$$

$$m^0 1^0 t^0 = \left(\frac{m}{l^3}\right)^\alpha \left(\frac{m}{1-t}\right)^\beta \left(\frac{1}{t}\right)^\chi \left(\frac{m}{l^3}\right)^\delta \left(\frac{m}{1-t}\right)^\epsilon \left(\frac{1}{t}\right)^\phi \left(\frac{m}{t^2}\right)^\gamma (1)^\eta \left(\frac{1}{t^2}\right)^\iota \quad (35)$$

Thus $$0 = \alpha + \beta + \delta + \epsilon + \gamma \text{ (mass)}$$

$$0 = -3\alpha - \beta + \chi - 3\delta - \epsilon + \phi + \eta + \iota \text{ (length)}$$

$$0 = -\beta - \chi - \epsilon - \phi - 2\gamma - 2\iota \text{ (time)} \quad (36)$$

Some manipulation enables expressing $\gamma$, $\eta$, and $\iota$ in terms of $\alpha$, $\beta$, $\chi$, $\delta$, $\epsilon$, and $\phi$.

$$\gamma = -\alpha - \beta - \delta - \epsilon$$

$$\eta = 2\alpha + \beta/2 - \chi/2 + 2\delta + \epsilon/2 - \phi/2$$

$$\iota = \alpha + \beta/2 - \chi/2 + \delta + \epsilon/2 - \phi/2 \quad (37)$$

Substituting $$\frac{a_m}{a_d} \propto (\rho_V^\alpha)(\mu_V^\beta)(v_V^\chi)(\rho_L^\delta)(\mu_L^\epsilon)(v_L^\phi)(\sigma^{-\alpha-\beta-\delta-\epsilon}) \quad (38)$$

$$(d_e^{2\alpha+\beta/2-\chi/2+2\delta+\epsilon/2-\phi/2})(g^{\alpha+\beta/2-\chi/2+\delta+\epsilon/2-\phi/2})$$

and then collecting terms with the same power law exponents gives the following $$\frac{a_m}{a_d} \propto \left(\frac{\rho_V d_e^2 g}{\sigma}\right)^\alpha \left(\frac{\mu_V d_e^{1/2} g^{1/2}}{\sigma}\right)^\beta \qquad (39)$$

$$\left(\frac{V_V}{d_e^{1/2} g^{1/2}}\right)^\chi \left(\frac{\rho_L d_e^2 g}{\sigma}\right)^\delta \left(\frac{\mu_L d_e^{1/2} g^{1/2}}{\sigma}\right)^\varepsilon \left(\frac{v_L}{d_e^{1/2} g^{1/2}}\right)^\phi \text{ or}$$

$$\frac{a_m}{a_d} \propto (Bo_V)^\alpha \left(\frac{\mu_V d_e^{1/2} g^{1/2}}{\sigma}\right)^\beta (\sqrt{Fr_V})^\chi (Bo_L)^\delta \left(\frac{\mu_L d_e^{1/2} g^{1/2}}{\sigma}\right)^\varepsilon (\sqrt{Fr_L})^\phi \qquad (40)$$

These dimensionless groupings are less well-known than the Reynolds number, Weber number, and Froude number $$Re_V = \frac{d_e V_V \rho_V}{\mu_V}$$

$$Re_L = \frac{d_e V_L \rho_L}{\mu_L}$$

$$We_L = \frac{d_e \rho_L v_L^2}{\sigma}$$

$$Fr_L = \frac{v_L^2}{g d_e}$$

Some additional substitutions yield the following alternate relationship for $a_m/a_d$ $$\frac{a_m}{a_d} \propto \qquad (41)$$

$$\left(\frac{\rho_V}{\rho_L}\right)^{\alpha-\chi} \left(\frac{\mu_V}{\mu_L}\right)^{\beta+\chi} \left(Re_L^{-\beta-\chi-\varepsilon}\right)\left(Fr_L^{\phi/2-\alpha-\beta/2+\chi/2-\varepsilon/2}\right)\left(We_L^{\alpha+\beta+\varepsilon}\right)\left(Re_V^\chi\right)$$

The final equation for $a_m/a_d$ is $$\frac{a_m}{a_d} = A_M \left(\frac{\rho_V}{\rho_L}\right)^A \left(\frac{\mu_V}{\mu_L}\right)^B (Re_L^X)(Fr_L^\Delta)(We_L^E)(Re_V^\Phi) \qquad (42)$$

Note the appearance of the groups $(\rho_V/\rho_L)$ and $(\mu_V/\mu_L)$ in the equation for $a_m/a_d$. These groups have either not been considered in the development of other correlations for the mass transfer area or the exponents A and B have been assumed to be zero a priori. Onda et al., BRF82; Billett and Schultes 1999. Applicant chooses to retain these two groups.

For sheet metal structured packings, Applicant adjusts equation (42) in an ad hoc way to allow it to account for the corrugation inclination angle:

$$\frac{a_m}{a_d} = A_M \left(\frac{\rho_V}{\rho_L}\right)^A \left(\frac{\mu_V}{\mu_L}\right)^B (Re_L^X)(Fr_L^\Delta)(We_L^E)(Re_V^\Phi)\left(\frac{\cos(\theta)}{\cos(\pi/4)}\right)^t \qquad (43)$$

where "θ" is the corrugation inclination angle in radians measured from the vertical. The adjustment for correlation inclination angle in equation (43) allows the development of a single set of fitting coefficients for all inclination angles rather than individual correlating expressions for each inclination angle.

Final Expression for the ⟨HETP⟩

Substituting rearranged versions of equations (31), (32), and (42) into equation (28) for ⟨HETP⟩ yields (for random packings and metal gauze "X" style packings; a further adjustment for corrugation inclination angle appears in the general formulation for sheet metal structured packings, as discussed above):

$$\langle HETP \rangle = \frac{G d_e}{\left(A_M \left(\frac{\rho_V}{\rho_L}\right)^A \left(\frac{\mu_V}{\mu_L}\right)^B (Re_L^X)(Fr_L^\Delta)(We_L^E)(Re_V^\Phi) a_d\right)} \qquad (44)$$

$$\left(\frac{C_y}{A_V Re_V^m Sc_V^n c_V D_V} + \frac{C_x}{A_L Re_L^b Sc_L^c c_L D_L}\right)$$

Note that the equation (44) for the ⟨HETP⟩ expressed in terms of independent expressions for $k_y$, $k_x$, and $a_m$ (as opposed to expressions for the combined quantities $k_y a_m$ and $k_x a_m$) is not unique. It is possible to factor out the front factor $A_L$ (for example) and define two new relative front factors for $k_y$ and $a_m$:

$$\langle HETP \rangle = \frac{G d_e}{\left(A'_M \left(\frac{\rho_V}{\rho_L}\right)^A \left(\frac{\mu_V}{\mu_L}\right)^B (Re_L^X)(Fr_L^\Delta)(We_L^E)(Re_V^\Phi) a_d\right)} \qquad (45)$$

$$\left(\frac{C_y}{A'_V Re_V^m Sc_V^n c_V D_V} + \frac{C_x}{Re_L^b Sc_L^c c_L D_L}\right)$$

where $$A'_M = A_M A_L \qquad (46)$$

$$A'_V = A_V / A_L \qquad (47)$$

Therefore, it not generally possible to deconvolute experimentally measured ⟨HETP⟩ data from binary distillation experiments into unique correlating expressions for $k_y$, $k_x$, and $a_m$ from the ⟨HETP⟩ dataset alone. In order to resolve the "equation (45)" dilemma, the absolute magnitude of any one of the front factors—$A_V$, $A_L$, $A_M$—appearing in equation (44) must be established.

Equation (44) contains thirteen fitting coefficients. Ten of these appear as exponents on dimensionless groupings. Trying to fit data to an equation in which the same physical quantity simultaneously contributes to one or more dimensionless groups in the equation presents statistical difficulties. Meaningless correlations have been known to result when variations in the data to be fit and in the physical parameters making up the dimensionless groupings are sufficiently large and random.

In order to try to avoid the majority of these statistical difficulties, Applicant fixes the values of several of the power law exponents in equation (44) by appealing to verified results from other types of experiments or to some type of mechanistic/heuristic analogy between fluid friction and mass transfer.

The Mass Transfer Coefficient Correlation for Vapor Flow

Churchill presents a detailed discussion of several of the gas-side mass transfer correlations derived from classical hydraulic analogies. S. W. Churchill, 'Critique of the Classical Algebraic Analogies between Heat, Mass, and Momentum Transfer', Industrial and Engineering Chemistry Research, 36 (1997), 3866-78. One such analogy is that of Chilton and Colburn. This analogy is:

$$j_D = \frac{Sh_V}{Re_V^1 Sc_V^{1/3}} = \frac{f}{2} \tag{48}$$

$$f = F(Re_V) \tag{49}$$

where "f" is the friction factor. Although the correlation is at odds with some theoretical findings, it is reasonably accurate for flows in which no form drag is present. The packings considered here—metal Pall rings, metal IMTP, and sheet metal structured packings with crimp geometries similar to MELLAPAK—have open structures; therefore, form drag should be small. Rather than use the Chilton-Colburn analogy in its "strong" form, Applicant instead uses a "weak" form of equation (48):

$$j_D \propto J_D(Re_V) \tag{50}$$

For vapor flow through Pall rings, IMTP, and sheet metal structured packings, the dry friction factor is often found to be weakly dependent on the Reynolds number (often $f \propto Re^{-0.2 \text{ to } 0}$). Therefore Applicant assumes that the vapor phase Sherwood number scales like:

$$Sh_V \propto Re_V^1 Sc_V^{1/3} \tag{51}$$

for random packings. There is an additional effect of corrugation inclination angle on the vapor side mass transfer coefficient for sheet metal structured packings. For these, Applicant assumes:

$$Sh_V \propto Re_V^1 Sc_V^{1/3} \left(\frac{\cos(\theta)}{\cos(\pi/4)}\right)^s \tag{52}$$

where "θ" is the corrugation inclination angle in radians measured from the vertical. The metal gauze "X" style structured packings (BX, DX, and EX) tend to have smaller flow channels with friction factors that are more strongly dependent on the vapor Reynolds number. For them, Applicant assumes $$Sh_V \propto Re_V^{1/2} Sc_V^{1/3} \tag{53}$$

The Mass Transfer Coefficient Correlation for Liquid Film Flow

Mathematical solution of the hydrodynamic and mass conservation equations for the absorption of a slightly soluble gas into a laminar, falling, liquid film on a plane surface gives the following result for the liquid side mass transfer coefficient (R. B. Bird, W. E. Stewart and E. N. Lightfoot, Transport Phenomena, 2nd edn (New York: John Wiley & Sons, 2002)):

$$Sh_L = 1.128 Re_L^{1/2} Sc_L^{1/2} \tag{54}$$

However, the liquid film's flow regime in most packed columns is expected to be turbulent, partly due to the induced shear at the liquid interface due to the turbulent countercurrent flow of the vapor. There is much less general consensus for the form of the liquid film mass transfer coefficient relation under these circumstances. Two models often chosen to describe mass transfer in a turbulent liquid film are the penetration/surface renewal model and the film model. The film model predicts that the liquid side mass transfer coefficient is directly proportional to the binary diffusivity. This implies that:

$$Sh_L \propto Sc_L^0 \tag{55}$$

Penetration/surface renewal theory, on the other hand, predicts that the liquid side mass transfer coefficient is proportional to the square root of the liquid diffusivity, so that:

$$Sh_L \propto Re_L^1 Sc_L^{1/2} f(Re_L) \tag{56}$$

Assuming that the friction factor is nearly independent of Reynolds number, equation (56) reduces to $$Sh_L \propto Re_L^1 Sc_L^{1/2} \tag{57}$$

Turning now to the experiment, Sherwood and Holloway correlated absorption and desorption data for various gases in water with the expression:

$$Sh_L = \alpha \left(\frac{L}{\mu_L}\right)^{1-n} Sc_L^{1/2} \tag{58}$$

with the exponent "n" ranging from 0.22 to 0.46 for Raschig rings and saddles. Koch, et al., measured liquid film mass transfer coefficients for the absorption of $CO_2$ into water using Raschig rings and found:

$$k_L a_m \propto L^{0.96} \tag{59}$$

Van Krevelen and Hoftijzer postulated that:

$$\frac{k_L \delta}{D_L} = c' Re_L^b Sc_L^{1/3} \tag{60}$$

Potnis and Lenz studied liquid desiccant systems for gas drying using random as well as structured packings. They reported that:

$$Sh_L \propto Re_L^b Sc_L^{1/2} \tag{61}$$

with the exponent "b" ranging from 0.9 to 1.2. Shetty and Cerro studied the flow of liquid films over periodic surfaces similar to those found in structured packings. They predicted that:

$$Sh_L \propto Re_L^{1/3} Sc_L^{1/2} \tag{62}$$

Given the wide variability in the values of the power law exponents on the liquid Reynolds number and Schmidt number, Applicant has assumed that:

$$Sh_L = A_L Re_L^1 Sc_L^{1/3} \tag{63}$$

holds for metal Pall rings, metal IMTP, sheet metal structured packings, and metal gauze structured packings. Equation (63) can be taken to imply that a form of the Chilton-Colburn analogy holds for turbulent liquid film flow.

Analysis Methodology

Figure 4:
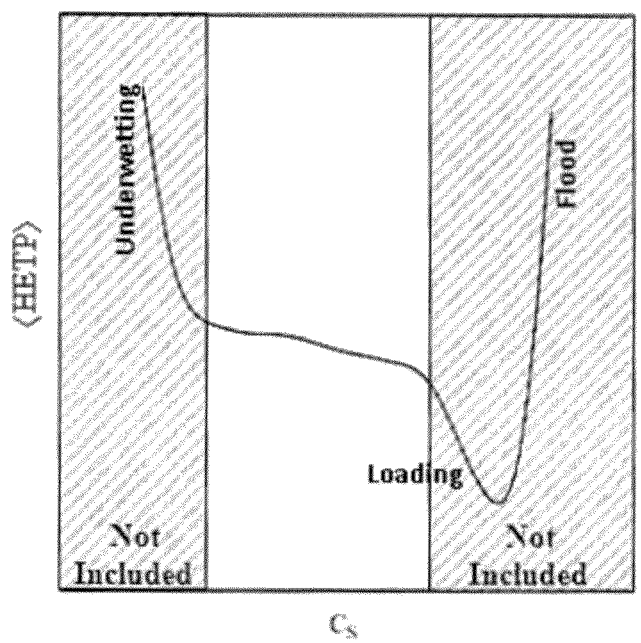
FIG. 4 is a schematic diagram showing the potentially complicated variation of $\langle HETP \rangle$ with density corrected vapor flow, $C_S$, for a column operating at total reflux. Data from the regions labeled "Not Included" were not included in datasets used in the regressions described herein.

The variation of the ⟨HETP⟩ with liquid and vapor flowrates can be quite complex. FIG. 4 is an illustration of "typical" ⟨HETP⟩ behavior for a binary distillation at total reflux. For low liquid flowrates there is a deterioration in column efficiency due to underwetting of the packing. The efficiency also deteriorates near flood. Sometimes, there is also a region near loading with enhanced column efficiency. D. L. Bennett, 'Optimize Distillation Columns Part II: Packed Columns', Chemical Engineering Progress, 2000, 27-34. The simple power law expressions that we have proposed for $k_y$, $k_x$, and $a_m$ cannot reproduce the complexity of this typical ⟨HETP⟩ behavior. Therefore, we have limited our analysis to the intermediate regions of the ⟨HETP⟩ function, where the variations of the ⟨HETP⟩ with flowrate are more amenable to description with simple power law expressions for $k_y$, $k_x$, and $a_m$.

Because the contribution of the liquid side resistance has been found to be small in the great majority of binary distillations, Applicant proceeds by setting the front factor, $A_L$, in equation (44) to unity (this is equivalent to using equation (45)). This then fixes the contribution of the small liquid side resistance to the ⟨HETP⟩. Since the small contribution of the liquid phase resistance is now completely specified, Applicant can curve fit experimental ⟨HETP⟩ data to equation (45) to determine the power law exponents (A, B, X, Δ, E, and Φ) on the various dimensionless groups and to obtain the relative values of the front factors $A'_M (=A_M A_L)$ and $A'_V (=A_V/A_L)$.

Figure 5:
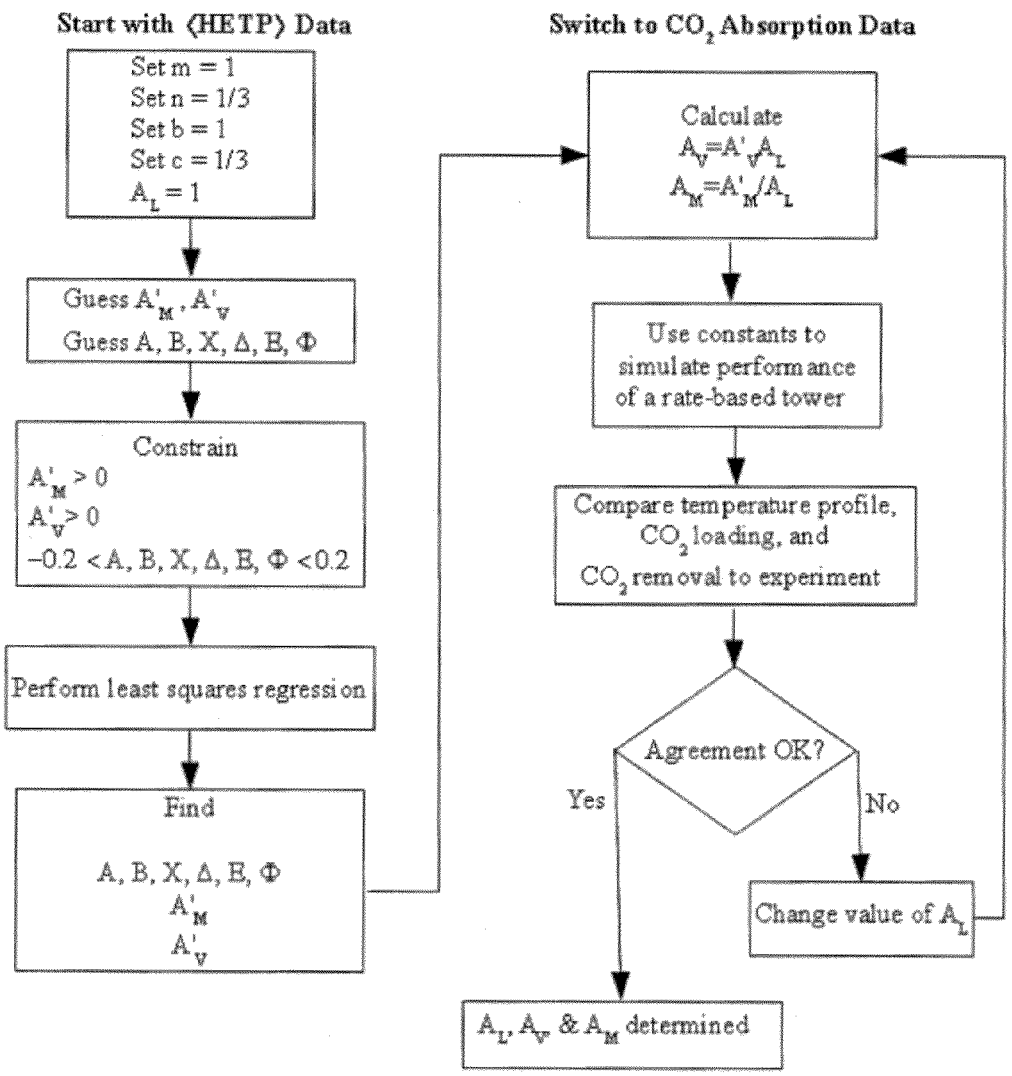
FIG. 5 is a flowchart showing the work flow for the data fitting procedure according to this invention.

Once this curve fit has been performed, then determining the absolute values of the front factors $A_L$, $A_V$, and $A_M$ proceeds by analyzing a different experiment or set of experiments where the contribution of the individual phase resistances to the overall resistance is different, such as switching from vapor-phase controlled empirical data (e.g., binary distillation experiments) to liquid-phase controlled empirical data. Binary distillations include, for example, cyclohexane/n-heptane, p-xylene/o-xylene, ethylbenzene/styrene, ethanol/water, methanol/water, acetone/water, i-butane/n-butane, and i-octane/toluene. Liquid-phase controlled empirical data include liquid-phase-controlled gas absorption data and liquid stripping data. Liquid-phase-controlled gas absorption data can include carbon dioxide absorption data, chlorine ($Cl_2$) or fluorine ($F_2$) absorption into strong aqueous caustic, or the absorption of dilute $NO_2$ into a strong aqueous solution of $Na_2S$ and caustic. Examples of liquid stripping that are controlled on the liquid side include removal of oxygen from water with a gas stream of pure nitrogen, removal of dilute $H_2S$ from a strongly acidic solution by air, and removal of dilute $CO_2$ from a strongly acidic solution by nitrogen. In each case, the gas phase will contain very little of the species being stripped. Further, the Henry's law constants for these systems favor the component being in the vapor rather than in the liquid. Therefore, the resistance resides almost exclusively in the liquid phase. Typically, Applicant has used data from $CO_2$ absorption into aqueous amine or aqueous caustic solutions. Applicant uses the mass transfer correlations regressed from the binary distillation (vapor-phase-controlled) experiments to predict the performance of the $CO_2$ absorber (and sometimes the stripper) using the Aspen Rate Based Distillation module. Initially, the front factors values are fixed at $A_L=1$, $A'_V$, and $A'_M$. The predicted temperature profile, outlet $CO_2$ concentration, and outlet amine loading are noted and their deviation from experiment recorded. If necessary, the front factor $A_L$ is adjusted to some new value, keeping $A'_V$, and $A'_M$ fixed, thereby maintaining the quality of fit to the ⟨HETP⟩ empirical data. The reader should recall that $A'_M = A_L A_M$ and that $A'_V = A_V/A_L$. Applicant typically uses an interval halving method to determine the best value for $A_L$. There is some judgment involved in deciding what value for $A_L$ is best overall since the analysis of individual experiments oftentimes leads to a spread in $A_L$ values. A flow diagram outlining the fitting process to identify $A_L$, $A_M$ and $A_V$ is shown in FIG. 5.

Figure 21:
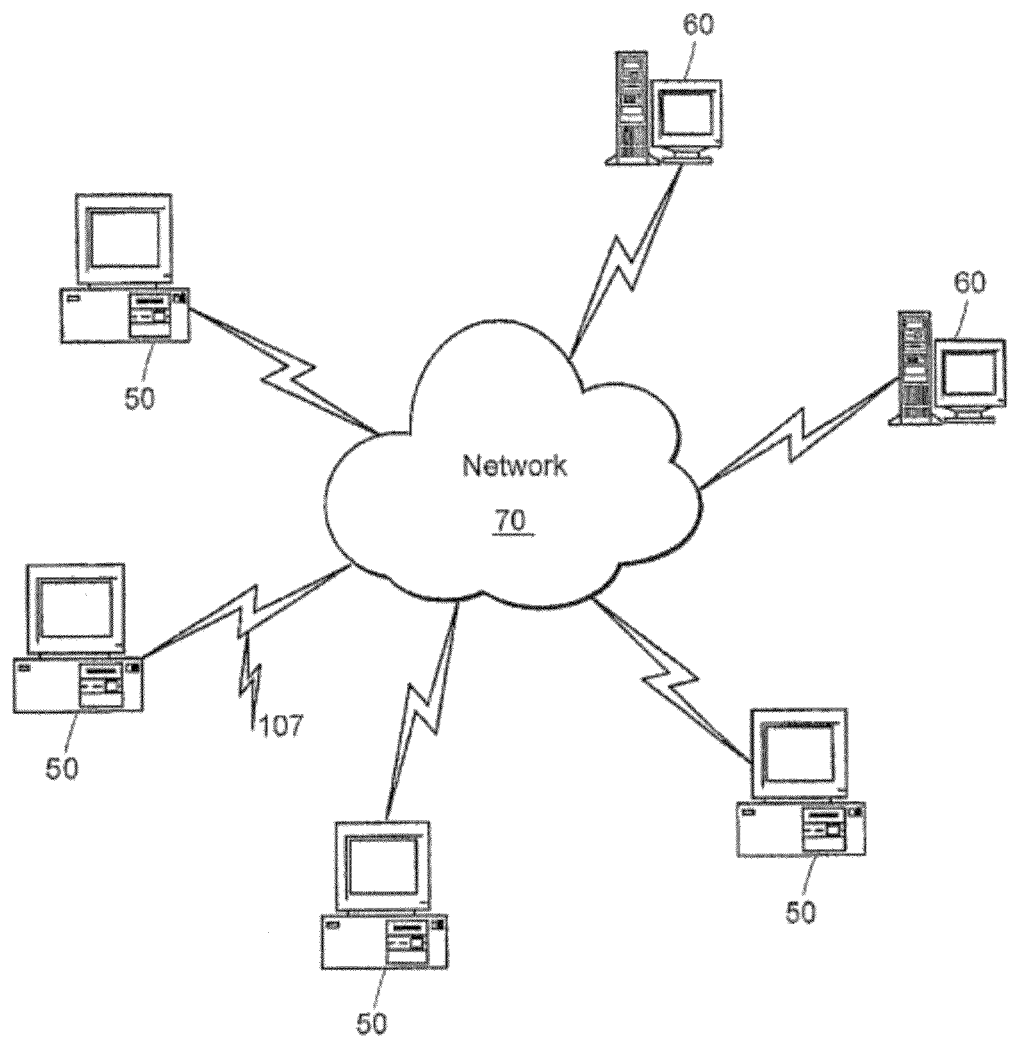
FIG. 21 is an illustration of a computer network or similar digital processing environment in which the present invention can be implemented.

FIG. 21 illustrates a computer network or similar digital processing environment in which the present invention may be implemented.

Client computer(s)/devices 50 and server computer(s) 60 provide processing, storage, and input/output devices executing application programs and the like. Client computer(s)/devices 50 can also be linked through communications network 70 to other computing devices, including other client devices/processes 50 and server computer(s) 60. Communications network 70 can be part of a remote access network, a global network (e.g., the Internet), a worldwide collection of computers, Local area or Wide area networks, and gateways that currently use respective protocols (TCP/IP, Bluetooth, etc.) to communicate with one another. Other electronic device/computer network architectures are suitable.

Figure 22:
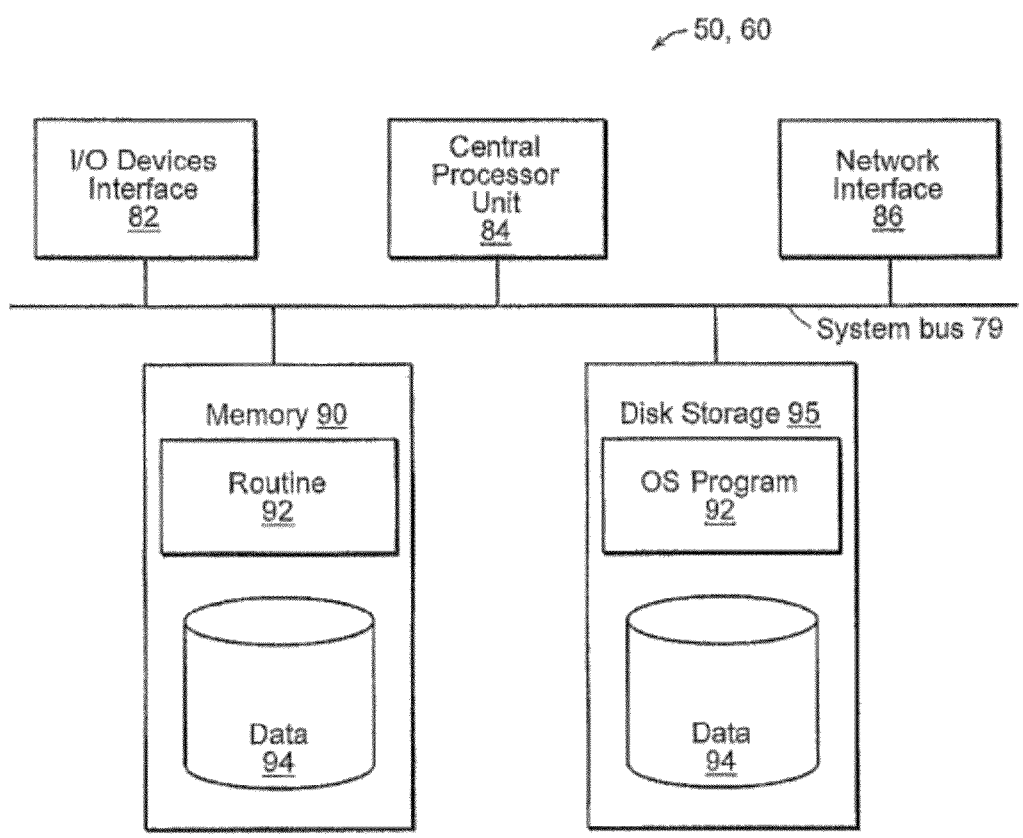
FIG. 22 is a diagram of the internal structure of a computer in the computer system of FIG. 21.

FIG. 22 is a diagram of the internal structure of a computer (e.g., client processor/device 50 or server computers 60) in the computer system of FIG. 21. Each computer 50, 60 contains system bus 79, where a bus is a set of hardware lines used for data transfer among the components of a computer or processing system. Bus 79 is essentially a shared conduit that connects different elements of a computer system (e.g., processor, disk storage, memory, input/output ports, network ports, etc.) that enables the transfer of information between the elements. Attached to system bus 79 is I/O device interface 82 for connecting various input and output devices (e.g., keyboard, mouse, displays, printers, speakers, etc.) to the computer 50, 60. Network interface 86 allows the computer to connect to various other devices attached to a network (e.g., network 70 of FIG. 21). Memory 90 provides volatile storage for computer software instructions 92 and data 94 used to implement an embodiment of the present invention (e.g., analysis methodology and flow diagram (FIG. 5) detailed above). Disk storage 95 provides non-volatile storage for computer software instructions 92 and data 94 used to implement an embodiment of the present invention. Central processor unit 84 is also attached to system bus 79 and provides for the execution of computer instructions.

In one embodiment, the processor routines 92 and data 94 are a computer program product (generally referenced 92), including a computer readable medium (e.g., a removable storage medium such as one or more DVD-ROM's, CD-ROM's, diskettes, tapes, etc.) that provides at least a portion of the software instructions for the invention system. Computer program product 92 can be installed by any suitable software installation procedure, as is well known in the art. In another embodiment, at least a portion of the software instructions may also be downloaded over a cable, communication and/or wireless connection. In other embodiments, the invention programs are a computer program propagated signal product 107 embodied on a propagated signal on a propagation medium (e.g., a radio wave, an infrared wave, a laser wave, a sound wave, or an electrical wave propagated over a global network such as the Internet, or other network(s)). Such carrier medium or signals provide at least a portion of the software instructions for the present invention routines/program 92.

In alternate embodiments, the propagated signal is an analog carrier wave or digital signal carried on the propagated medium. For example, the propagated signal may be a digitized signal propagated over a global network (e.g., the Internet), a telecommunications network, or other network. In one embodiment, the propagated signal is a signal that is transmitted over the propagation medium over a period of time, such as the instructions for a software application sent in packets over a network over a period of milliseconds, seconds, minutes, or longer. In another embodiment, the computer readable medium of computer program product 92 is a propagation medium that the computer system 50 may receive and read, such as by receiving the propagation medium and identifying a propagated signal embodied in the propagation medium, as described above for computer program propagated signal product.

Generally speaking, the term "carrier medium" or transient carrier encompasses the foregoing transient signals, propagated signals, propagated medium, storage medium and the like.

Data Sources and Data Correlation

⟨HETP⟩ data for binary distillation systems and temperature profile/amine loading/outlet sour gas composition data from acid gas absorption/stripping experiments were collected for the packing types under study here. M. Schultes, 'Raschig Super-Ring: A New 4th Generation Packing', Chemical Engineering Research & Design, 81 (2003), 48-57; C. W. Fitz, J. G. Kunesh and A. Shariat, 'Performance of Structured Packing in a Commercial-Scale Column at Pressures of 0.02-27.6 bar', Industrial & Engineering Chemistry Research, 38 (1999), 512-18; R. Agrawal and others, 'Impact of Low Pressure prop Structure Packing on Air Distillation', in Distillation and Absorption: IChemE Symposium Series 128 (1992), CXXVIII, A125; J. A. Kean, H. M. Turner and B. C. Price, 'Structured Packing Proven Superior for TEG Gas Drying', Oil & Gas Journal, 1991, 41-46; R. Billet, 'Recent Investigations of Metal Pall Rings', Chemical Engineering Progress, 63 (1967), 53; J. J. Gualito and others, 'Design Method for Distillation Columns Filled with Metallic, Ceramic, or Plastic Structured Packings', Industrial and Engineering Chemistry Research, 36 (1997), 1747-57; A. Lawal and others, 'Dynamic Modelling of $CO_2$ Absorption for Post Combustion Capture in Coal-Fired Power Plants', Fuel (7th European Conference on Coal Research and Its Applications), 88 (2009); J. Gabrielsen and others, 'Experimental Validation of a Rate-Based model for $CO_2$ Capture Using an AMP Solution', Chemical Engineering Science 62 (2007) 2397-2413; J. A. Rocha, J. L. Bravo and J. R. Fair, 'Distillation Columns Containing Structured Packings: A Comprehensive Model for Their Performance. 2. Mass-Transfer Model', Industrial and Engineering Chemistry Research, 35 (1996), 1660-67; I. Wagner, J. Stichlmair and J. R. Fair, 'Mass Transfer in Beds of Modern, High-Efficiency Random Packings', Industrial and Engineering Chemistry Research, 36 (1997), 227-37; Jr., F. Rukovena, H. Niknafs and G. Hausch, 'Mass Transfer and Hydraulic Details on Intalox PhD Packing', Distillation and Absorption 2002-Proceedings, 2002, paper 6-9; E. E. Ludwig, Applied Process Design for Chemical and Petrochemical Plants, 3rd edn (Houston: Gulf Professional Publishing, 1997), II; N. Kolev, Packed Bed Columns for Absorption, Desorption, Rectification and Direct Heat Transfer (London: Elsevier, 2006) (hereafter referred to as Kolev); G. Shiveler and others, 'Retrofit of a $H_2S$ Selective Amine Absorber Using MellapakPlus Structured Packing', in 2005 Spring AIChE Meeting (Atlanta: AIChE, 2005); D. deMontigny, A. Aboudheir and P. Tontiwachwuthikul, 'Modelling the Performance of a $CO_2$ Absorber Containing Structured Packing', Industrial and Engineering Chemistry Research, 45 (2006), 2594-600; Sv. Nakov and others, 'Comparison of the Effective Area of Some Highly Effective Packings', Chemical Engineering and Processing, 46 (2007), 1385-1390 (hereafter referred to as Sv. Nakov and others); S. Wang, Z. Zeng and X. Li, 'Investigation on Rectifying Characteristics of Two New Tower Packings', Huagong Xuebao (Chinese Edition), 41 (1990); K. Bennett and M. Pilling, 'Efficiency Benefits of High Performance Structured Packings', in Texas Technology Showcase 2003, D2: Separations or Distillation Technologies (Houston: 2003); M. H. de Brito, 'Gas Absorption Experiments in a Pilot Column with the Sulzer Structured Packing MELLAPAK' (thesis, Ecole Polytechnique Federale de Lausanne, 1991); N. Kolev and others, 'Effective Area of a Highly Effective Random Packing', Chemical Engineering and Processing, 45 (2006), 429-436; M. Duss, H. Meierhofer and D. E. Nutter, 'Effective Interfacial Area and Liquid Holdup of Nutter Rings at High Liquid Loads', Chemical Engineering and Technology, 24 (2001), 716-23, summarized in Kolev, p. 214.

The data for the various packing families were individually analyzed using the methodology outlined above. Several ad hoc limiting conditions were placed upon the power law exponents in the fits. For all but the BX style gauze structured packing, power law exponents were limited to the range −0.2 to 0.2. In the case of BX, the range was expanded to −0.25 to 0.25. The reasons for limiting the ranges of the power law coefficients are difficult to elucidate. Part of the explanation lies in the fact that data fitting becomes more problematic when the same physical quantity appears in more than one dimensionless grouping. For example, fitting the data with no imposed restrictions would often result in power law exponents with large magnitudes but whose net effect on some variable, usually the liquid velocity, would be small to negligible. A further consideration was the fact that many other reported mass transfer correlations have power law exponents on dimensionless groupings whose magnitudes are less than one. G. Q. Wang, X. G. Yuan and K. T. Yu, 'Review of Mass-Transfer Correlations for Packed Columns', Industrial and Engineering Chemistry Research, 44 (2005), 8715-29. The final reason was a pragmatic one—limiting the range on these coefficients resulted in correlations whose predictions were generally better in every situation, and which turned out to be more robust in the simulator. The results are listed in Eqs. 64-75 and compared to experimental ⟨HETP⟩ results in FIGS. 6-9.

Metal Pall Rings:

$$k_x = 1.0 Re_L^1 Sc_L^{1/3} \left( \frac{c_L D_L}{d_e} \right) \tag{64}$$

$$k_y = 0.001046 Re_V^1 Sc_V^{1/3} \left( \frac{c_V D_V}{d_e} \right) \tag{65}$$

$$\frac{a_m}{a_d} = 0.25 Re_V^{0.134} Re_L^{0.205} We_L^{0.0752} Fr_L^{-0.164} \left( \frac{\rho_V}{\rho_L} \right)^{-0.1538} \left( \frac{\mu_V}{\mu_L} \right)^{0.195} \tag{66}$$

Metal IMTP:

$$k_x = 1.0 Re_L^1 Sc_L^{1/3} \left( \frac{c_L D_L}{d_e} \right) \tag{67}$$

$$k_y = 0.004726 Re_V^1 Sc_V^{1/3} \left( \frac{c_V D_V}{d_e} \right) \tag{68}$$

$$\frac{a_m}{a_d} = 0.3325 Re_V^{0.132} Re_L^{-0.1018} We_L^{0.1944} Fr_L^{-0.2} \left( \frac{\rho_V}{\rho_L} \right)^{-0.1538} \left( \frac{\mu_V}{\mu_L} \right)^{0.195} \tag{69}$$

Sheet Metal Structured Packing:

$$k_x = 0.33 Re_L^1 Sc_L^{1/3} \left( \frac{c_L D_L}{d_e} \right) \tag{70}$$

$$k_y = 0.0084 Re_V^1 Sc_V^{1/3} \left( \frac{c_V D_V}{d_e} \right) \left( \frac{\cos(\theta)}{\cos(\pi/4)} \right)^{-7.152} \tag{71}$$

$$\frac{a_m}{a_d} = 0.5386 Re_V^{0.14552} Re_L^{-0.15268} \tag{72}$$

$$We_L^{0.2} Fr_L^{-0.2} \left( \frac{\rho_V}{\rho_L} \right)^{-0.033} \left( \frac{\mu_V}{\mu_L} \right)^{0.090} \left( \frac{\cos(\theta)}{\cos(\pi/4)} \right)^{4.078}$$

Metal Gauze Structured Packing in the "X" Configuration $$k_x = 12 Re_L^1 Sc_L^{1/3} \left(\frac{c_L D_L}{d_e}\right) \quad (73)$$

$$k_y = 0.3516\, Re_V^{1/2} Sc_V^{1/3} \left(\frac{c_V D_V}{d_e}\right) \quad (74)$$

$$\frac{a_m}{a_d} = 2.308 Re_V^{-0.274} Re_L^{0.246} We_L^{0.2484} Fr_L^{-0.1614} \left(\frac{\rho_V}{\rho_L}\right)^{-0.1798} \left(\frac{\mu_V}{\mu_L}\right)^{0.2332} \quad (75)$$

Figure 6:
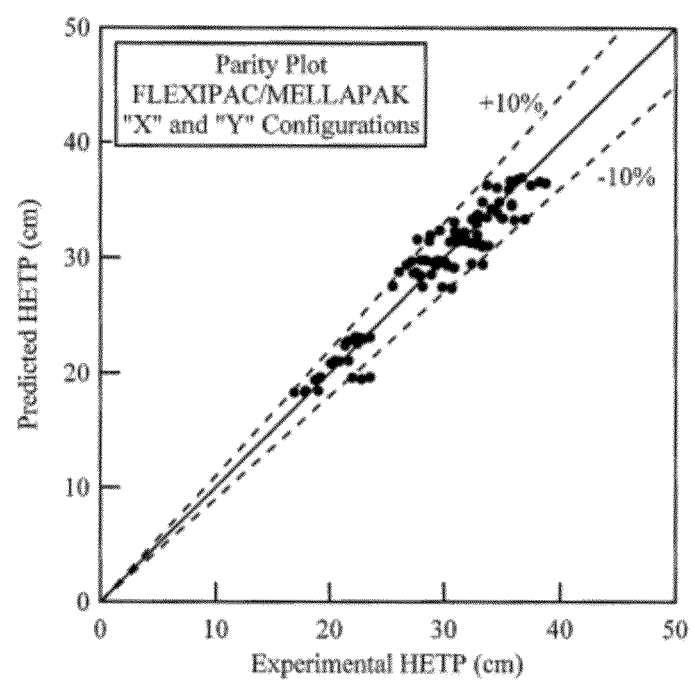
FIG. 6 is a parity plot comparing the $\langle HETP \rangle$ calculated according to this invention to the experimentally measured $\langle HETP \rangle$ for sheet metal structured packings of the MELLAPAK/FLEXIPAC type. Data for both the "Y" and "X" packing configurations were used in the regression.
Figure 7:
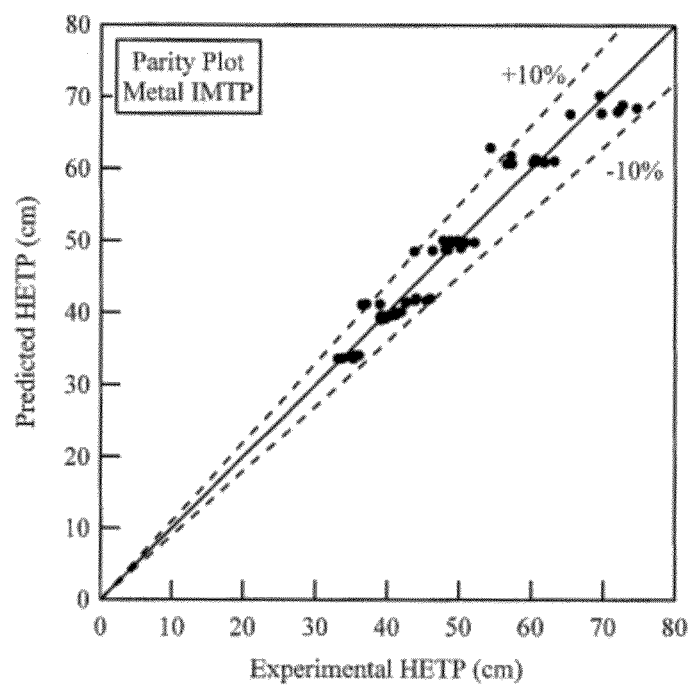
FIG. 7 is a parity plot comparing the $\langle HETP \rangle$ calculated according to this invention to the experimentally measured $\langle HETP \rangle$ for metal IMTP random packing.
Figure 8:
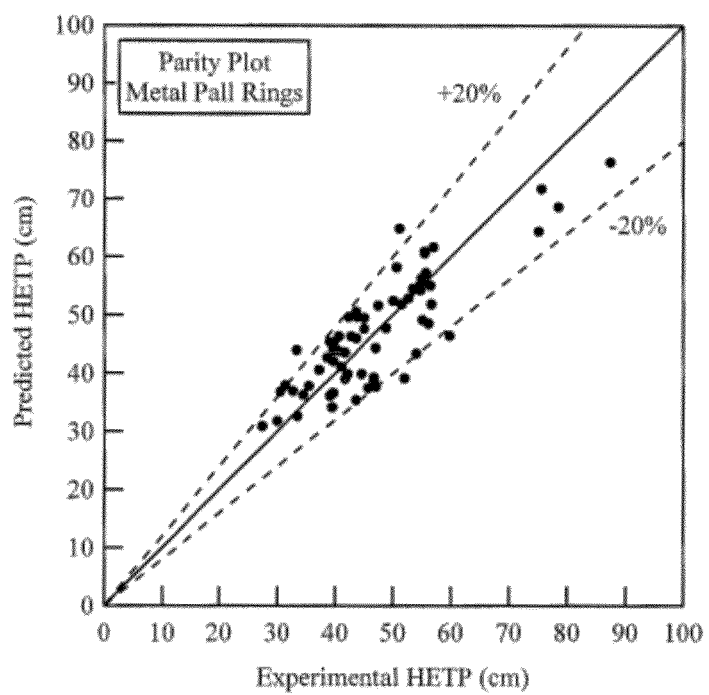
FIG. 8 is a parity plot comparing the $\langle HETP \rangle$ calculated according to this invention to the experimentally measured $\langle HETP \rangle$ for metal Pall rings random packing.
Figure 9:
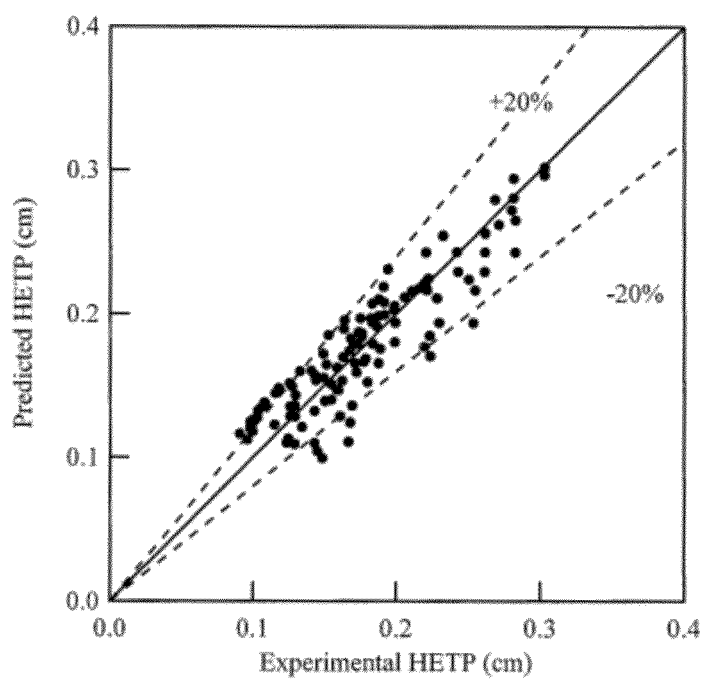
FIG. 9 is a parity plot comparing the $\langle HETP \rangle$ calculated according to this invention to the experimentally measured $\langle HETP \rangle$ for metal gauze structured packings in the X configuration (BX, DX, EX).
Figure 10A:
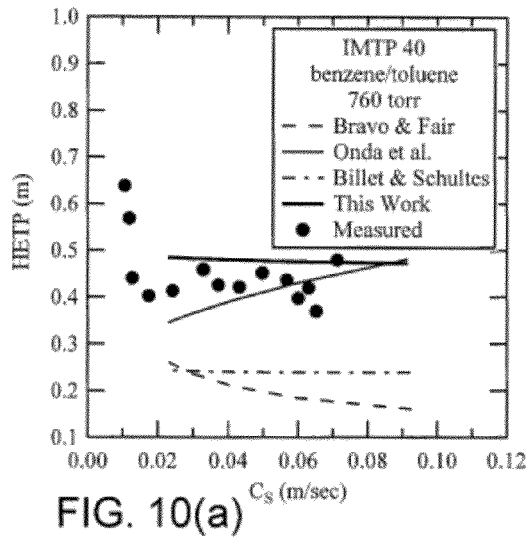
FIGS. 10(a)-(d) are graphs of comparisons of correlation predictions with experimental data for metal IMTP.
Figure 10B:
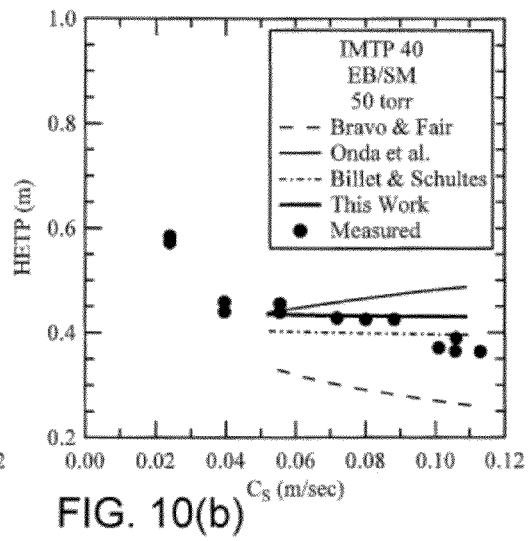
Figure 10C:
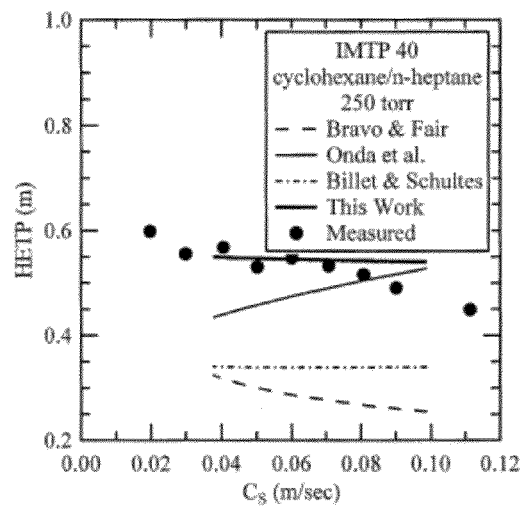
Figure 10D:
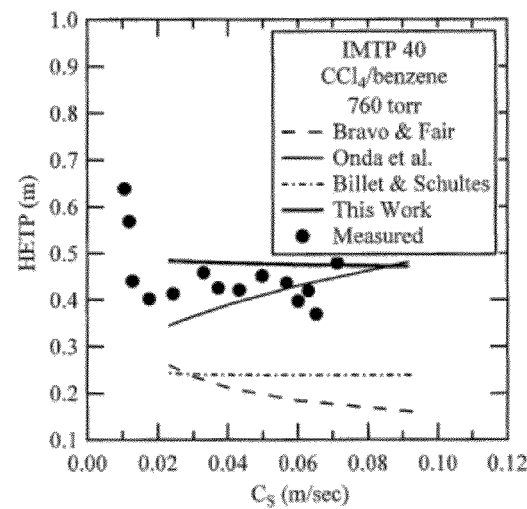
Figure 11A:
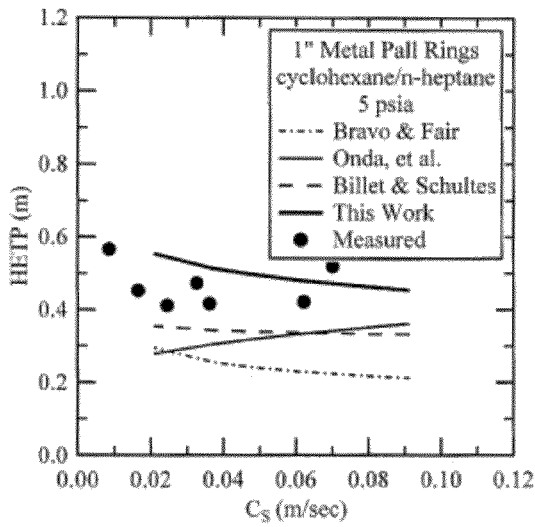
FIGS. 11(a)-(d) are graphs of comparisons of correlation predictions with experimental data for metal Pall rings.
Figure 11B:
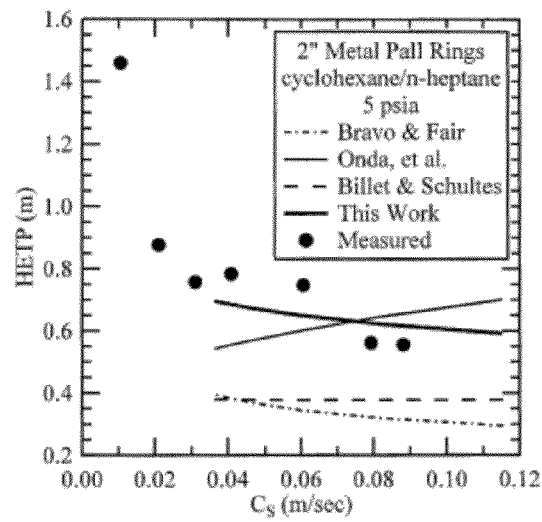
Figure 11C:
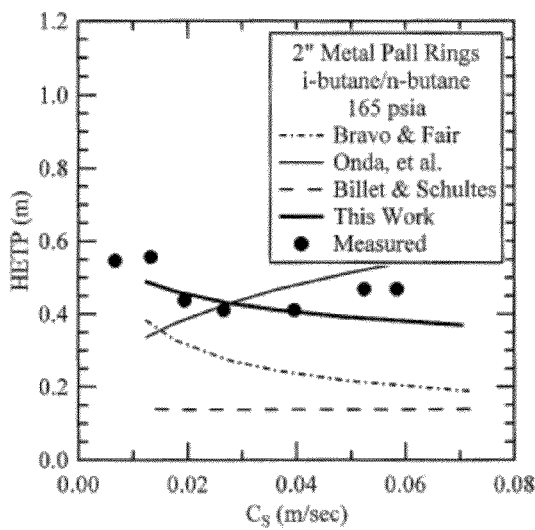
Figure 11D:
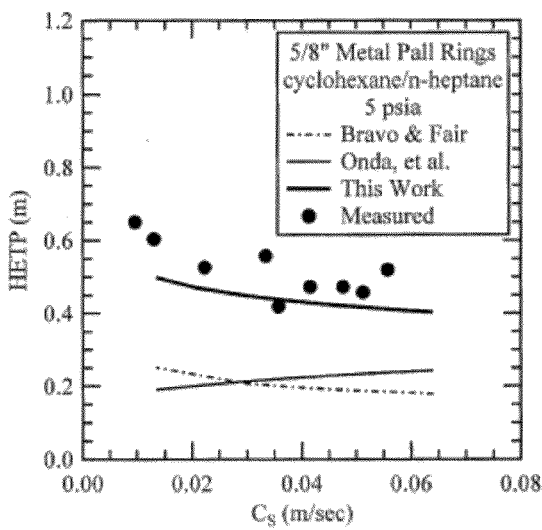
Figure 12A:
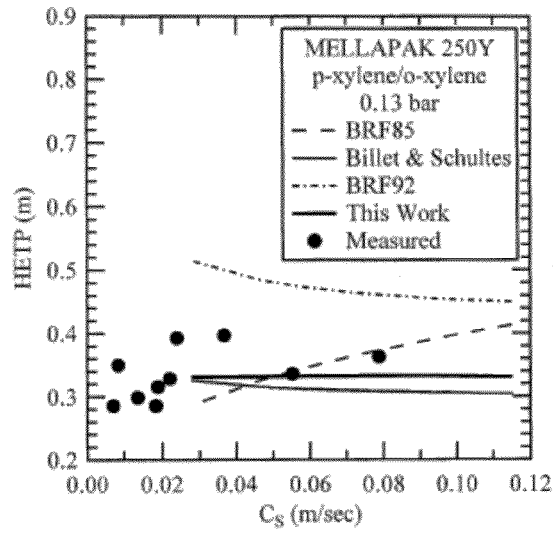
FIGS. 12(a)-(d) are graphs of comparisons of correlation predictions with experimental data for sheet metal structured packings.
Figure 12B:
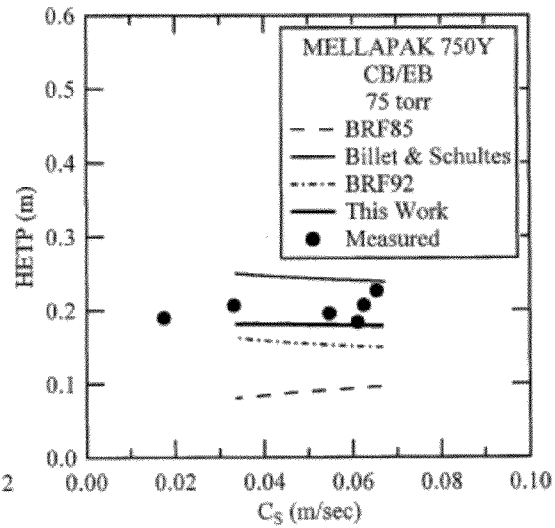
Figure 12C:
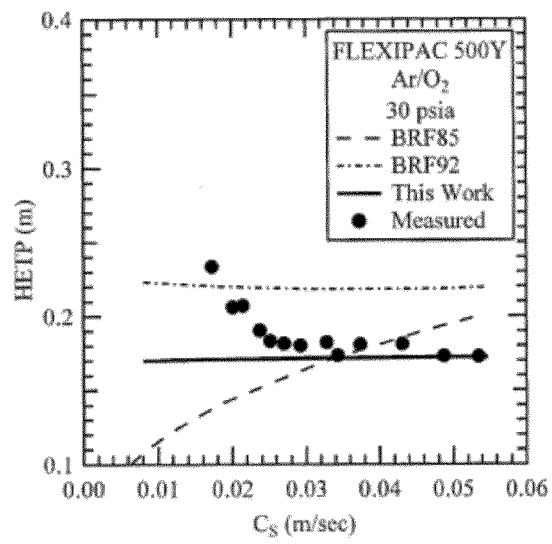
Figure 12D:
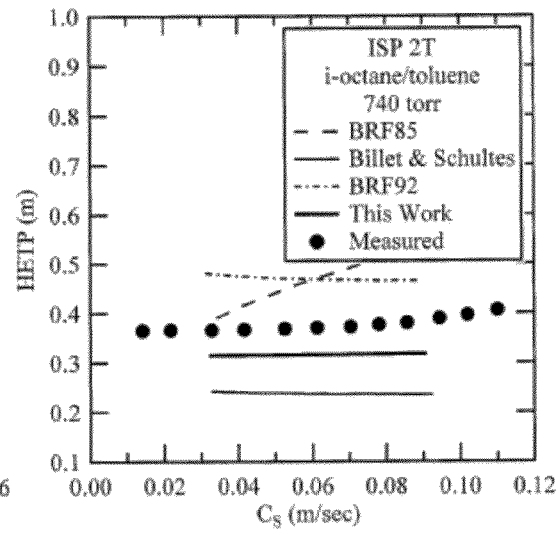

FIG. 6 is a parity plot of the predicted values for ⟨HETP⟩ versus the reported values for the various MELLAPAK/FLEXIPAC family of sheet metal structured packings. FIG. 7 is a similar plot for metal IMTP random packing; FIG. 8 for metal Pall rings; and FIG. 9 for metal gauze BX structured packing.

Comparison to Experiment

In this section, Applicant compares predictions made with the mass transfer correlations developed above to experiment for a number of different chemical systems and packing types. All calculations were carried out with Aspen Rate Based Distillation v7.2. In general, Applicant used the COUNTERCURRENT flow option and the NRTL physical property package for binary distillation simulations. For acid gas removal with amines or with caustic, Applicant used the VPLUG flow option (this option treats the liquid phase as well-mixed and the vapor as in plug flow) and the ELECNRTL package for physical properties. The reader is informed wherever Applicant has deviated from these conventions.

FIGS. 10(a)-(d) are comparisons of total reflux binary ⟨HETP⟩ data for metal IMTP with simulated results for a selection of different binary mixtures and packing sizes. In each case, the mass transfer coefficient correlation developed in this application for metal IMTP outperforms the other mass transfer correlations examined.

FIGS. 11(a)-(d) are comparisons of total reflux binary ⟨HETP⟩ data for metal Pall rings with simulated results for a selection of different binary mixtures and packing sizes. In each case, the mass transfer coefficient correlation developed in this application for metal Pall rings outperforms the other mass transfer correlations examined.

FIGS. 12(a)-(d) are comparisons of total reflux binary ⟨HETP⟩ data for sheet metal structured packings with simulated results obtained for a selection of different binary mixtures and packing sizes. In each case, the mass transfer coefficient correlation developed in this application for structured packings performs as well or better than the other mass transfer correlations examined.

Tables 1 and 2 contain an additional column with ⟨HETP⟩ predictions from the new mass transfer coefficient/interfacial area correlations developed in this application. The new mass transfer/interfacial area correlations are an improvement over the other public domain correlations examined here across a varied range of chemical systems and packing sizes/geometries.

Figure 13:
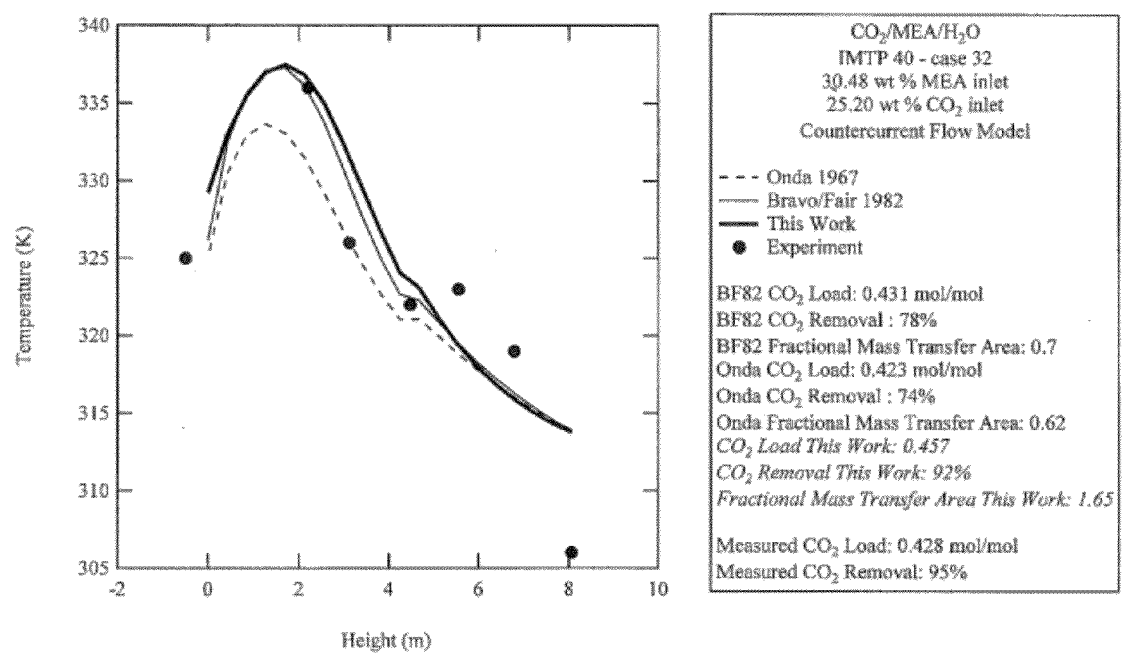
FIG. 13 is a graph of data of Lawal, et al., for the absorption of $CO_2$ into aqueous MEA (Case 32). All simulations performed with Aspen Rate Based Distillation v7.2 using the VPLUG flow model and the ELECNRTL property package. Correlations used in these calculations: Bravo and Fair, and Onda, et al.

Lawal, et al., have compared pilot plant data with the results of simulation studies on the absorption of $CO_2$ by monoethanolamine (MEA) in a column packed with IMTP 40 metal random packing. A. Lawal and others, 'Dynamic Modelling of $CO_2$ Absorption for Post Combustion Capture in Coal-Fired Power Plants', Fuel (7th European Conference on Coal Research and Its Applications), 88 (2009). The pilot plant data were taken by the Separations Research Program at the University of Texas, Austin. Y. Zhang and others, 'Rate-Based Process Modeling Study of $CO_2$ Capture with Aqueous Monoethanolamine Solution', Industrial and Engineering Chemistry Research, 48 (2009), 9233-46. Lawal, et al., report detailed results for two cases, referred to as 'case 32' and 'case 47'. Case 32 is the more interesting to study because the results are strongly dependent upon the mass transfer correlation selection. In Applicant's simulations, Applicant has used the Aspen v7.0 MEA model. Aspen Technology, Inc., Rate-Based Model of the $CO_2$ Capture Process by MEA using Aspen Plus (Burlington, Mass.: 2008). Lawal, et al., found that the experimental column temperature profile for case 32 could not be matched adequately in their simulations using the nominal flue gas flowrate of 0.13 kg/s. A. Lawal and others, Dynamic Modelling of $CO_2$ Absorption for Post Combustion Capture in Coal-Fired Power Plants', Fuel (7th European Conference on Coal Research and Its Applications), 88 (2009). Lawal, et al., obtained much closer agreement when the flue gas rate was reduced to 0.11 kg/s. In Applicant's simulations, the flue gas flowrate was reduced from the nominally measured value of 0.13 kg/s to 0.11 kg/s. Three mass transfer correlations were examined: a) the correlation of Onda, et al., b) the Bravo & Fair correlation of 1982, and the correlation for IMTP developed in this application. Results are summarized in FIG. 13. The temperature profile calculated with the Bravo & Fair correlation is in good agreement with experiment, but its prediction of $CO_2$ removal is noticeably in error. The correlation of Onda, et al., matches the temperature profile data well but its prediction of the outlet $CO_2$ flue gas concentration is noticeably in error. Only the new correlation for IMTP developed in this application matches the temperature profile, the rich amine loading, and the outlet flue gas $CO_2$ concentration simultaneously.

Figure 14A:
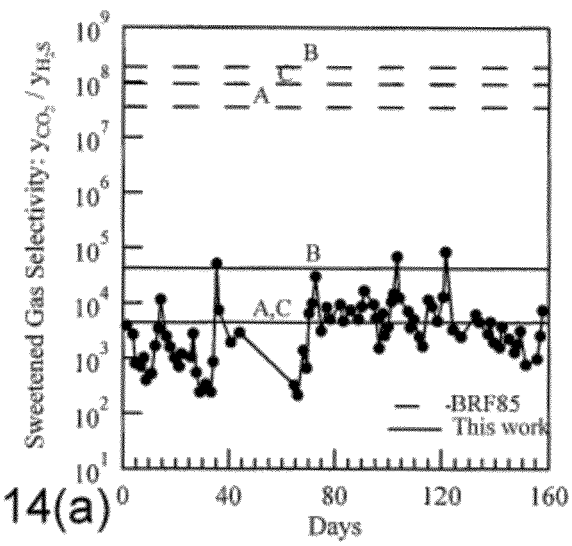
FIGS. 14(a)-(c) are graphs of data of Gabrielsen for the absorption of $CO_2$ into aqueous AMP. All simulations performed with Aspen Rate Based Distillation v7.2 using the VPLUG flow model and the ELECNRTL property package. Correlations used in this work: Bravo, Rocha, and Fair 1985 (BRF85), and Bravo, Rocha, and Fair 1992 (BRF92).
Figure 14B:
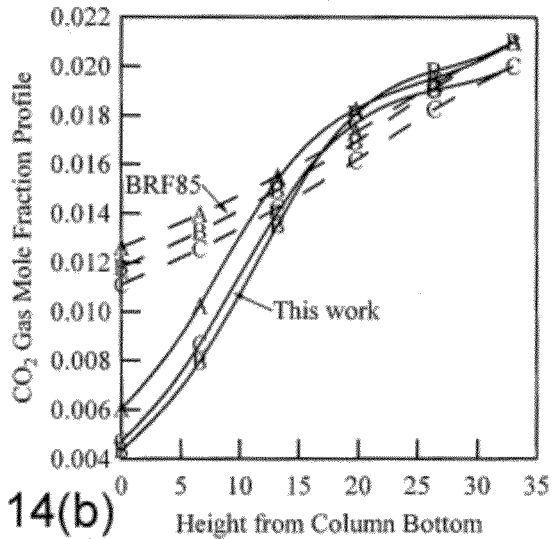
Figure 14C:
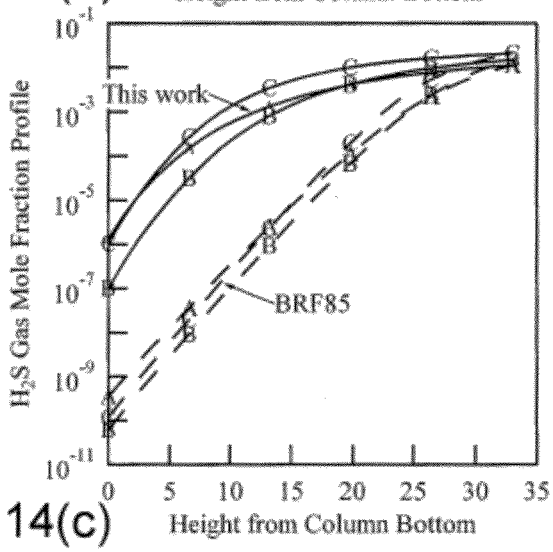

Gabrielsen has reported data associated with the absorption of $CO_2$ by an aqueous solution of 2-amino-2-methyl-1-propanol (AMP) in a column equipped with MELLAPAK 250Y. J. Gabrielsen and others, 'Experimental Validation of a Rate-Based model for $CO_2$ Capture Using an AMP Solution', Chemical Engineering Science 62 (2007) 2397-2413. A typical set of operating conditions is summarized in a brochure produced by Aspen Technology, Inc. Using these operating conditions, both the absorber and the stripper were simulated. Aspen Technology, Inc., Rate-Based Model of the $CO_2$ Capture Process by AMP using Aspen Plus (Burlington, Mass.: 2008). Gabrielsen's experimental temperature profile data are shown in FIGS. 14(a)-(c) along with simulated temperature profiles for the BRF85 correlation, the BRF92 correlation, and the mass transfer correlation for sheet metal structured packings of this application. Applicant's simulations used the Aspen v7.0 AMP model. Aspen Technology, Inc., Rate-Based Model of the $CO_2$ Capture Process by AMP using Aspen Plus (Burlington, Mass.: 2008). Each correlation produces an acceptable approximation to the actual temperature profile. Gabrielsen also reports the $CO_2$ outlet concentration, the rich solvent $CO_2$ loading, and the stripper reboiler duty. Applicant also reports these in FIG. 14 as outputs from each simulation. The correlation of this application reproduces acceptable approximations for all three quantities. Results from the BRF85 and BRF92 correlations show a much lower $CO_2$ loading than the experimental data.

Figure 15A:
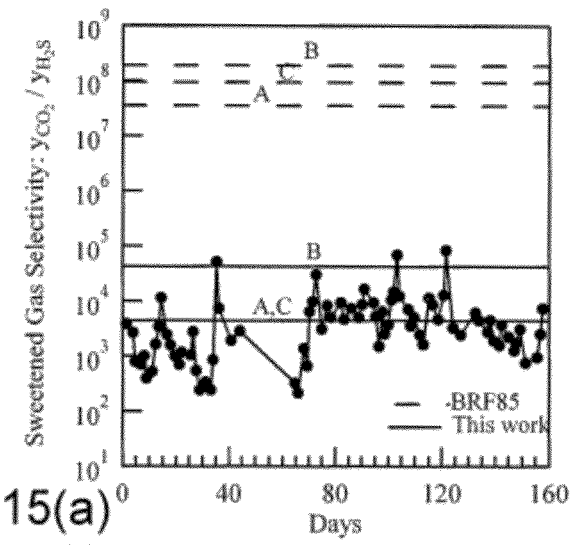
Figure 15B:
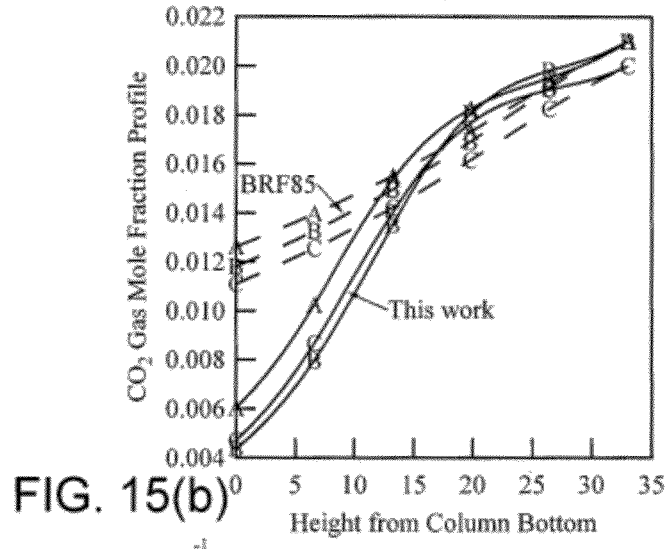
Figure 15C:
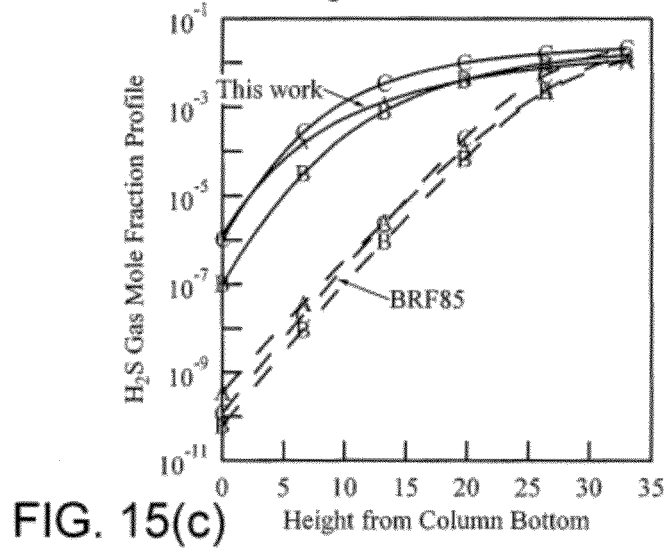
Figure 16:
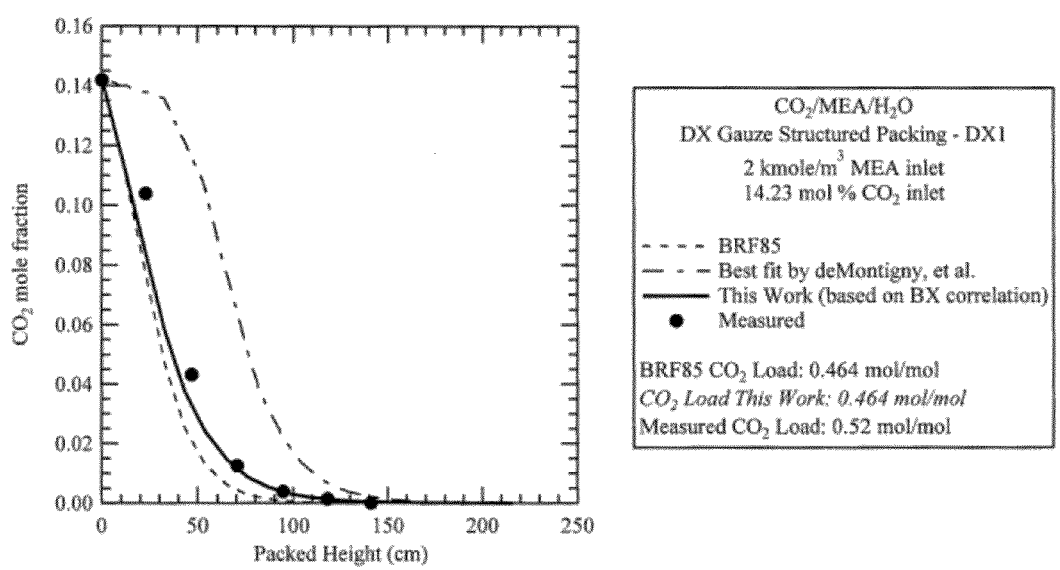
FIG. 16 is a graph of data of deMontigny, et al., for the absorption of $CO_2$ into aqueous MEA using DX metal gauze structured packing (experiment DX1). All simulations performed with Aspen Rate Based Distillation v7.2 using the VPLUG flow model and the ELECNRTL property package. Correlations used in these calculations: Bravo, Rocha, and Fair 1985, and deMontigny, et al.

Shiveler, et al., have reported performance data on an $H_2S$ selective absorber retrofitted with MELLAPAKPLUS 252Y sheet metal structured packing. G. Shiveler and others, 'Retrofit of a $H_2S$ Selective Amine Absorber Using MellapakPlus Structured Packing', in 2005 Spring AIChE Meeting (Atlanta: AIChE, 2005). The absorber employs aqueous methyl-diethanolamine (MDEA) as the absorbent. The efficiency of MELLAPAKPLUS 252Y has been reported to be virtually identical to that of MELLAPAK 250Y. Sulzer Chemtech, 'Structured Packings for Distillation, Absorption, and Reactive Distillation' (22.13.06.40). The authors reported the absorption selectivity, defined as $y_{CO_2}/y_{H_2S}$, at the column outlet over the course of several months. Because the inlet gas flow and its composition varied from day to day, three representative design cases were examined for the retrofit. Some of the temporal data collected for the selectivity after the retrofit are shown in FIGS. 15 (*a*)-(*c*). Also included are selectivity results for the three reported design cases (labeled in FIGS. 15 (*a*)-(*c*) as conditions A, B, and C) calculated with Aspen Rate Based Distillation v7.2 using the Aspen v7.0 MDEA model. Aspen Technology, Inc., Rate-Based Model of the $CO_2$ Capture Process by MDEA using Aspen Plus (Burlington, Mass.: 2008). Only the correlations developed in this application yielded selectivity results in line with those measured. The selectivities calculated with the BRF85, BRF92, and Billet & Schultes 1999 correlations were found to be orders of magnitude greater than the experiment values. Also shown in FIGS. 15 (*b*)-(*c*) are the calculated $CO_2$ and $H_2S$ composition profiles, respectively, for the BRF85 correlation and the new correlation reported here. Note that the $CO_2$ composition profiles for the two correlations are different by up to a factor of 3. The $H_2S$ profiles differ by a factor of up to 10,000.

deMontigny, et al., reported on the absorption of $CO_2$ by monoethanolamine (MEA) using the metal gauze structured packing DX. D. deMontigny, A. Aboudheir and P. Tontiwachwuthikul, 'Modelling the Performance of a $CO_2$ Absorber Containing Structured Packing', Industrial and Engineering Chemistry Research, 45 (2006), 2594-600. Applicant used the correlation developed from BX data, along with the Aspen v7.0 MEA model, to predict the performance of deMontigny's absorber equipped with DX. Aspen Technology, Inc., Rate-Based Model of the $CO_2$ Capture Process by MEA using Aspen Plus (Burlington, Mass.: 2008). FIG. 16 is a comparison of the measured $CO_2$ composition profile for run DX-1 with simulated results for the BRF85 correlation and the BX correlation described above. Also included in FIG. 16 are the authors' predictions based on their own mass transfer correlations. The BX correlation of this application successfully reproduces the reported $CO_2$ composition profile. Even though no other size of gauze packing was included in Applicant's BX fit, the BX correlation appears to be also applicable to DX and EX.

Implications: Mass Transfer Area

Figure 17A:
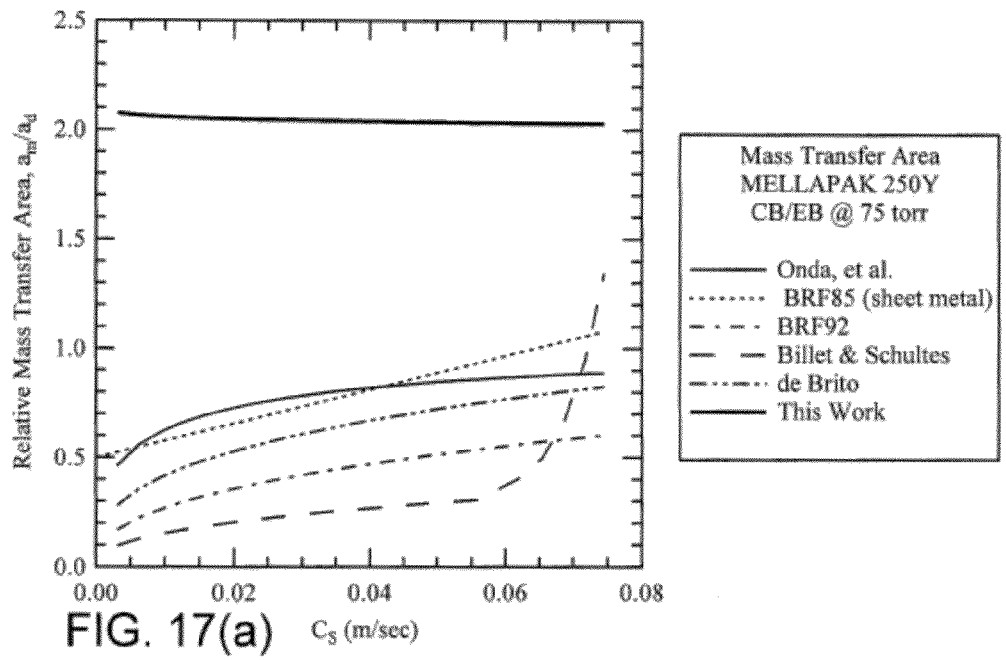
Figure 17B:
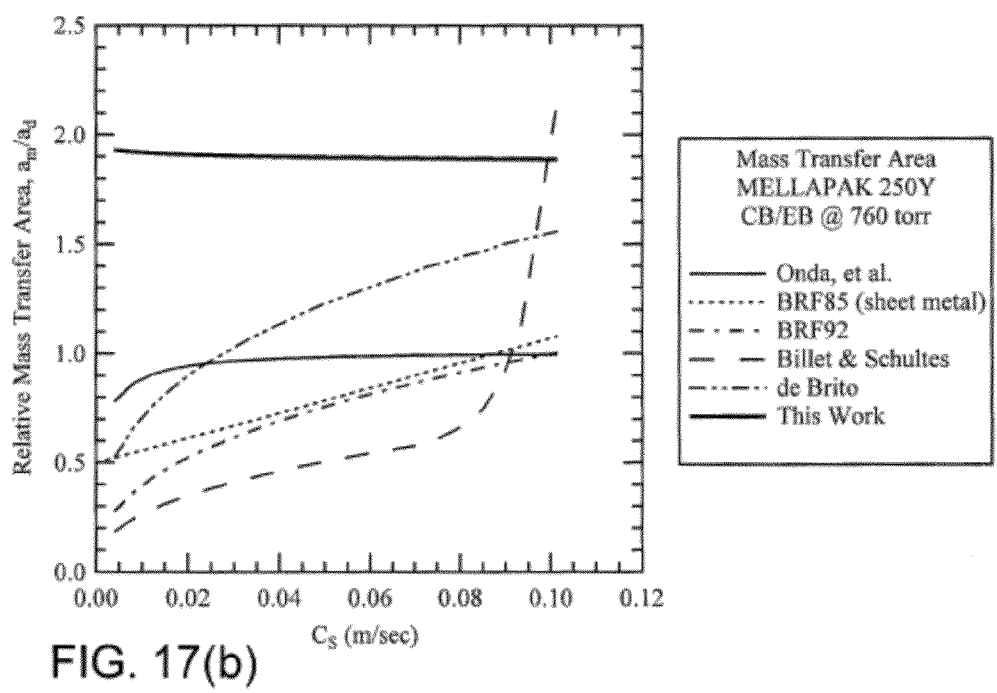

The data analysis methodology described in this application results in individual correlating expressions for $k_x$, $k_y$, and $a_m$. The fractional mass transfer area, $a_m/a_d$, is the subject of considerable controversy. The Delft correlation and that of Onda, et al., predict that the available area for mass transfer approaches the geometrical surface area of the packing exponentially as the liquid rate is increased. The BRF85 correlation for metal gauze structured packings assumes that $a_m = a_d$ under all operating conditions. The correlation of Rocha, et al., for $a_m$ is a power law in the liquid rate; $a_m/a_d$ can be greater or less than unity depending upon the other parameters in the correlation. The correlation of Billet and Schultes is also a power law in the liquid rate below the loading point. However, if the surface tension of the liquid is below 30 dynes/cm, then the mass transfer area is taken to be the geometrical surface area regardless of the nature of the packing's material of construction. For the sake of comparison, effective mass transfer areas for MELLAPAK 250Y sheet metal structured packing are displayed in FIGS. 17 (*a*)-(*b*) for the total reflux distillations of chlorobenzene/ethylbenzene (CB/EB) at 75 torr and at 760 torr, respectively. There are noticeable disagreements among the correlations. It might also appear surprising that some correlations, including the new structured packing correlation developed in this application, predict mass transfer areas well in excess of the dry geometrical surface area of the packing itself. It is important to stress that the interfacial area participating in mass transfer is only loosely correlated to the extent of wetting of the dry packing's geometrical surface area. Additional mass transfer area can come from the presence of waves on the surface of liquid films flowing over the packing surface, from liquid droplets, or from liquid filaments between packing elements, for example. Incomplete wetting of the packing surface would tend to reduce the mass transfer area relative the packing's geometrical surface area. It is more surprising, therefore, that some correlations identify the geometrical surface area of the packing as the maximum amount of interfacial area available for mass transfer.

The most widely used method for measuring $a_m$ is the absorption of $CO_2$ by aqueous NaOH under conditions where the concentration of $CO_2$ is low and there is excess [OH$^-$]. The total gas flow can then be treated as constant and the removal of $CO_2$ by reaction is well-approximated as pseudo-first order. The details of the experimental protocol and the methods of analysis are presented elsewhere. Kolev; R. E. Tsai and others, 'Influence of Surface Tension on Effective Packing Area', Industrial and Engineering Chemistry Research, 47 (2008), 1253-60.

The Danckwerts plot technique simultaneously yields $k_L$ and $a_m$ from mass transfer experiments. From the measurements of the gas absorption rate at different apparent first order reaction rate constants, the values of $k_L$ and $a_m$ can be determined using the Danckwerts surface renewal model. A. H. G. Cents, D. W. F. Brilman and G. F. Versteeg, '$CO_2$ Absorption in Carbonate/Bicarbonate Solutions: The Danckwerts-Criterion Revisited', Chemical Engineering Science, 60 (2005), 5830-5835.

$$\left(\frac{R_A}{m_A c_A V_L}\right)^2 = (k_L a_m)^2 + k_{1,app} D_A a_m^2 \tag{76}$$

Equation (76) is in the form of a straight line with the abscissa being the apparent pseudo-first order rate constant, $k_{1,app}$. In the case of $CO_2$ absorption into caustic, $k_{1,app} = k_{OH^-}$[OH$^-$].

The method employed by Tsai, et al., equates the two material balances obtained by considering material exchange starting from the vapor side and then from the liquid side. These balances yield the following relation between the physical liquid-side mass transfer coefficient, $k_L$, and the gas side mass transfer coefficient, $k_G$:

$$\frac{k_L}{H_{CO_2}}\sqrt{1+\frac{k_{OH^-}[OH^-]D_{L,CO_2}}{k_L^2}} = \frac{k_L}{H_{CO_2}}\sqrt{1+Ha^2} = k_G \tag{77}$$

When the Hatta number is large relative to unity, then the following simplification can be made:

$$\frac{1}{H_{CO_2}}\sqrt{k_{OH^-}[OH^-]D_{L,CO_2}} \cong k_G \quad Ha \gg 1 \tag{78}$$

The authors state that the approximation given in equation (78) introduces errors less than or equal to 6% in the calculation of $a_m$ for the Hatta numbers encountered in their investigations when the correlation of Rocha, et al., is used to estimate $k_L$. J. A. Rocha, J. L. Bravo and J. R. Fair, 'Distillation Columns Containing Structured Packings: A Comprehensive Model for Their Performance. 2. Mass-Transfer Model', Industrial and Engineering Chemistry Research, 35 (1996), 1660-67. However, it is known that estimates for $k_L$ based on correlations found in the literature can vary significantly from one another. G. Q. Wang, X. G. Yuan and K. T. Yu, 'Review of Mass-Transfer Correlations for Packed Columns', Industrial and Engineering Chemistry Research, 44 (2005), 8715-29. It is not clear, therefore, that the approximation of equation (78) is warranted nor is it clear what the actual uncertainties are in the reported values of $a_m$ when this approach is used.

Figure 18A:
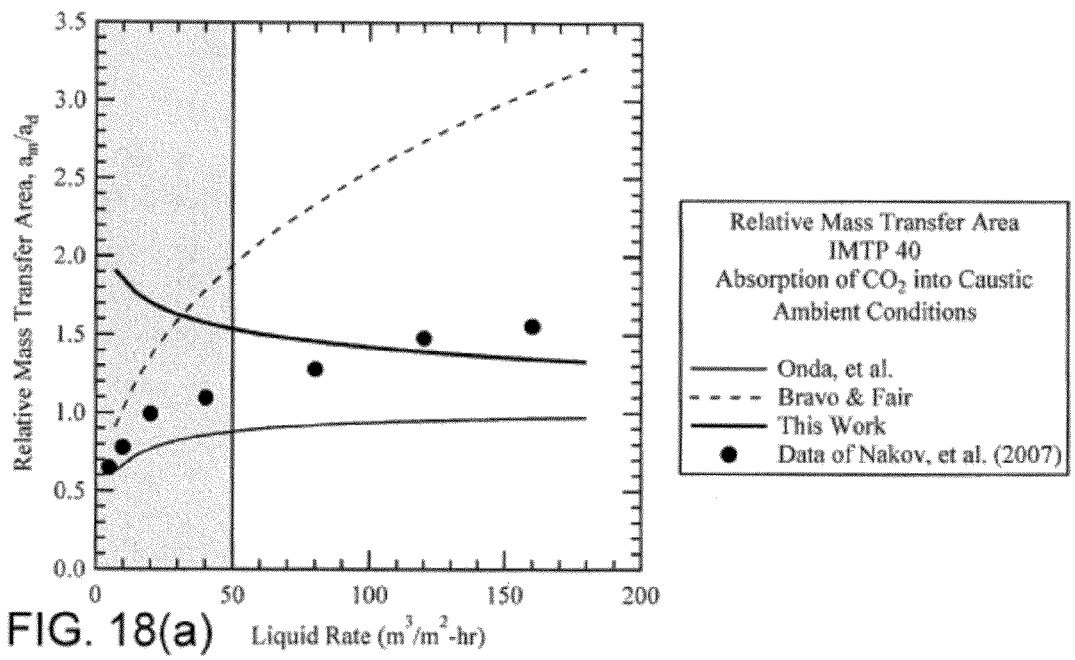
Figure 18B:
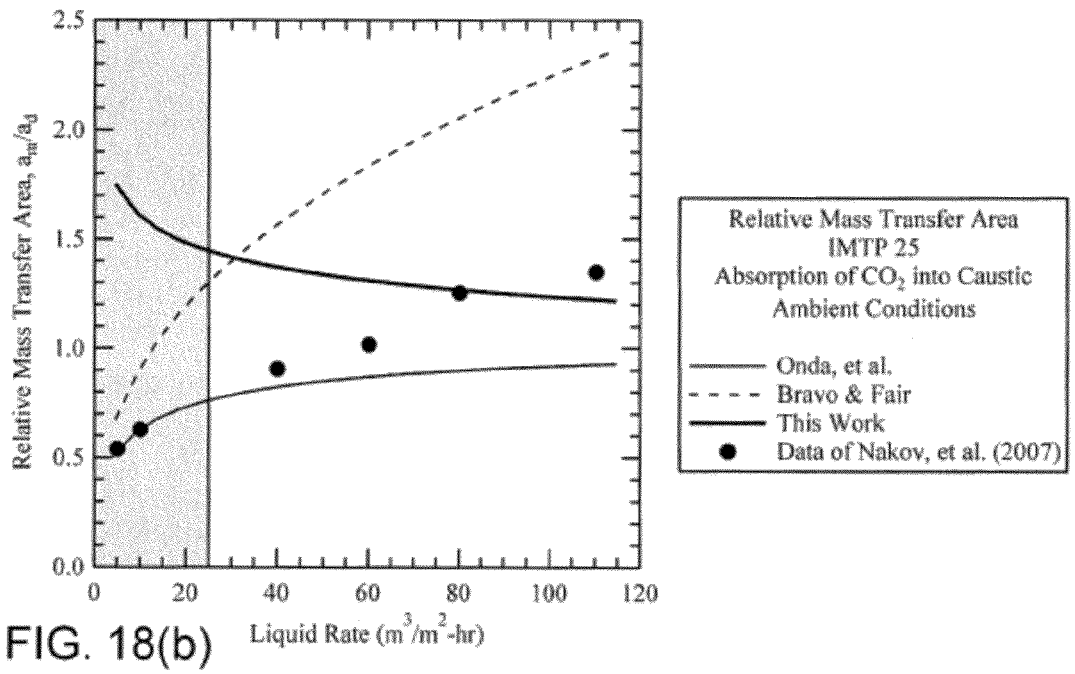
Figure 19A:
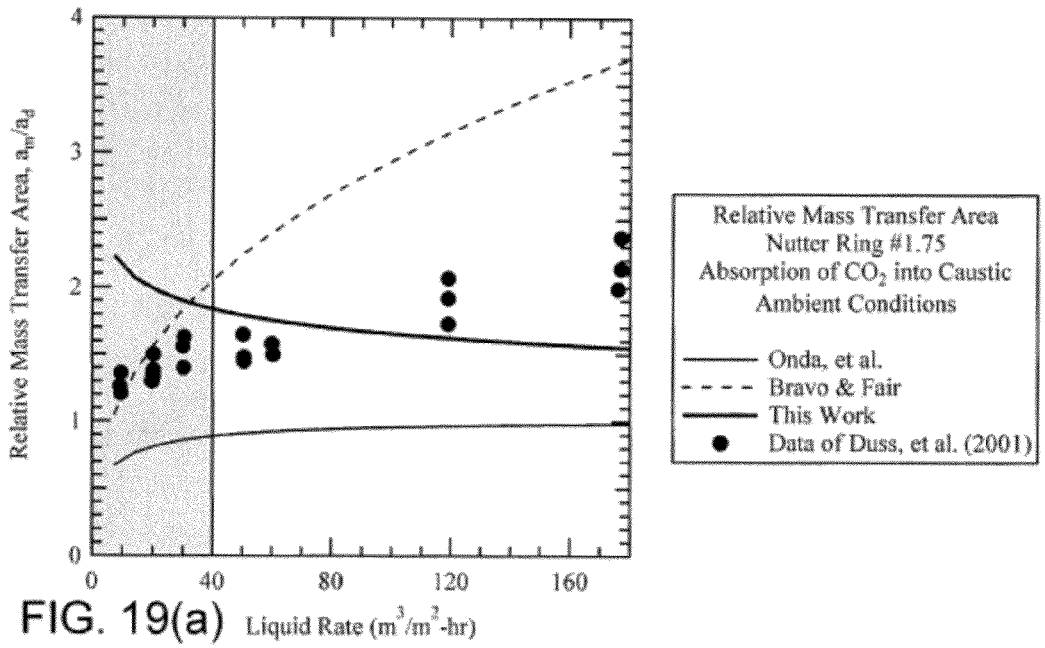
Figure 19B:
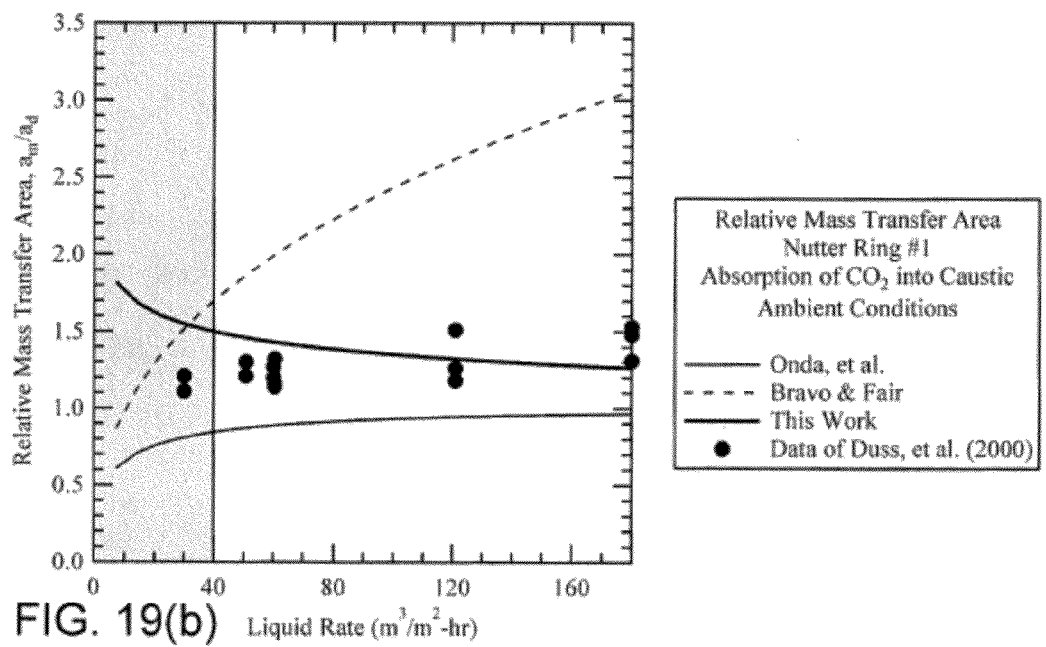

Nakov, et al., Kolev, et al., and Duss, et al., used the Danckwerts technique to analyze the $CO_2$ absorption into aqueous NaOH for metal and plastic Raschig Super-Rings, metal IMTP, metal Nutter rings, and plastic Ralu-Flow rings. Sv. Nakov and others; N. Kolev and others, 'Effective Area of a Highly Effective Random Packing', Chemical Engineering and Processing, 45 (2006), 429-436; M Duss, H. Meierhofer and D. E. Nutter, 'Effective Interfacial Area and Liquid Holdup of Nutter Rings at High Liquid Loads', Chemical Engineering and Technology, 24 (2001), 716-23, summarized in Kolev, p. 214. These data provide the opportunity to contrast the IMTP mass transfer area correlation predictions of equation (69) with experimentally measured values for the mass transfer area. FIGS. 18 (*a*)-(*b*) compare the data of Nakov, et al., for the variation of the effective mass transfer areas of IMTP 40 and IMTP 25, respectively, with liquid load to calculated variations based on the Onda correlation, the correlation of Bravo & Fair, and the IMTP area correlation developed in this application (equation (69)). Sv. Nakov and others; Onda, et al.; BRF82. FIGS. 19 (*a*)-(*b*) are similar comparisons using the data of Duss, et al., for Nutter rings #1.75 and #1, respectively (Nutter rings are geometrically very similar to IMTP). M Duss, H. Meierhofer and D. E. Nutter, 'Effective Interfacial Area and Liquid Holdup of Nutter Rings at High Liquid Loads', Chemical Engineering and Technology, 24 (2001), 716-23 summarized in Kolev, p. 214. A potential weakness of the new interfacial area correlations for random packings reported in this application is that they predict that the interfacial area for mass transfer increases as the liquid load goes to zero. However, one must recall that efficiency data in the low liquid rate regime, where there is significant underwetting of the packing's geometrical surface and an upturn in the ⟨HETP⟩, were excluded from consideration at the outset. Therefore, the upturns in the predicted interfacial area for mass transfer at low liquid rates observed with these correlations are an artifact of the assumptions made at the outset in developing them. In short, these correlations should not be applied below minimum liquid rate expected for good performance of the packing—typically about 30% to 40% of flood.

Figure 20:
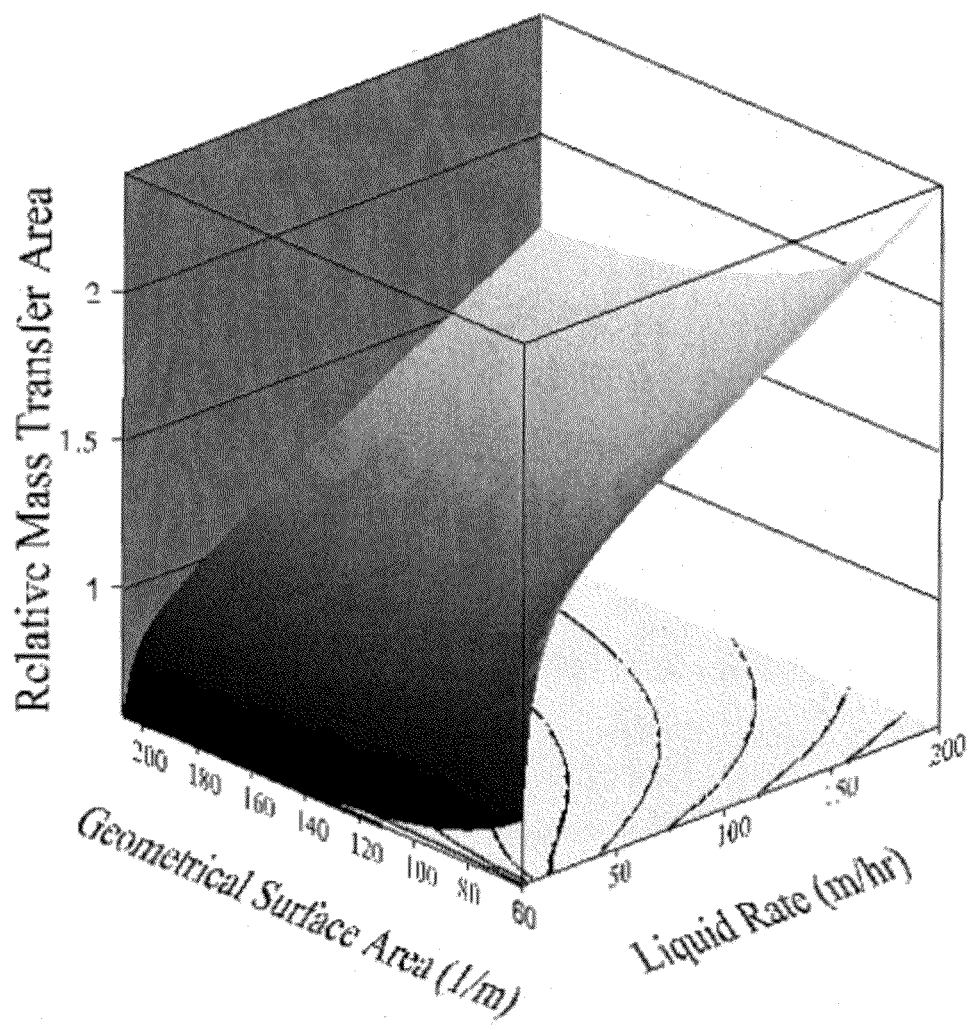
FIG. 20 is a graph of smoothed and interpolated data of Nakov, et al., for the relative mass transfer area of the IMTP family of random packings as a function of their geometrical surface area and the liquid rate.

In FIG. 20 the mass transfer area data of Nakov, et al., for the various IMTP sizes have been smoothed and interpolated to create a three dimensional portrayal of the mass transfer area as a function of the packing's dry surface area and of the liquid flowrate. Sv. Nakov and others. FIG. 20 implies that the mass transfer area for IMTP falls below the geometrical surface area for smaller packing sizes at low liquid flowrates. Conversely, the area participating in mass transfer greatly exceeds the dry packing surface area for larger packing sizes at higher liquid flowrates.

CONCLUSIONS

Mass transfer coefficient/effective surface area correlations for metal Pall rings, metal IMTP, sheet metal structured packings of the MELLAPAK/FLEXIPAC type, and metal gauze packings in the X configuration have been developed using a new fitting procedure based on dimensional analysis combined with concurrent fitting of binary ⟨HETP⟩ data and acid gas absorption data. The procedure and the resulting new correlations provide better estimates of mass transfer related quantities over a broader range of packing sizes and unit operations than do other public domain correlations. Used in rate-based calculations for columns, these correlations form part of the underlying equations for accurate prediction of equipment performance. The improved mass transfer correlations are particularly instrumental in the reliability of rate-based column calculations of chemical systems such as $CO_2$ capture with amines as chemical absorbents.

In some embodiments, the subject column is an existing column, and the determined column height and column width configurations are used for rating performance of the subject column. A column design calculation using a rigorous rate-based method is too complex to be undertaken manually. In order to rate the performance of a given column configuration (column height and column width), dozens of coupled differential and algebraic equations, including component balances, enthalpy balances, and hydraulics equations, need to be solved simultaneously. These, in turn, must be augmented with calculations of physical properties for each phase, as well as diffusion information for each component in each phase. Further, the solution scheme must also contain information related to rates of heat and mass transfer from one phase to another. The correlations developed by the methodology described here are used in the calculations of mass transfer rates as described above. Typically, they are implemented within a subroutine or function that is called by the main routine for solving the coupled set of equations describing the column. Current examples of column simulation software that would be capable of carrying out the aforementioned rate-based calculations to output column height and column width configurations for a subject column include Aspen Plus/Aspen Rate Based Distillation from Aspen Technology, Inc., PRO/II from Invensys Operations Management/SimSci-Esscor, Inc., and ChemSep from Chemsep.org.

The relevant teachings of all patents, published applications and references cited herein are incorporated by reference in their entirety.

SYMBOLS $a_d$: dry specific packing area
$a_m$: specific packing area participating in mass transfer
$A_L$: front factor on the liquid side mass transfer correlation (dimensionless)
$A_M$: front factor on the mass transfer area correlation (dimensionless)
$A_V$: front factor on the vapor side mass transfer correlation (dimensionless)
Bo: Bond number
$c_L$: liquid phase molar concentration
$c_V$: vapor phase molar concentration
D: column diameter
$D_L$: liquid phase binary diffusivity
$D_V$: vapor phase binary diffusivity
$C_S$: density corrected superficial vapor velocity=$v_V\sqrt{\rho_V/(\rho_L-\rho_V)}$
Cx: correction factor defined by equation (27)
Cy: correction factor defined by equation (26)
$d_e$: equivalent diameter=$4\epsilon/a_d$
$F_S$: $v_V\sqrt{\rho_V}$ $Fr_L$: liquid phase Froude number
g: acceleration of gravity
G: superficial molar vapor flux
HETP: point or local Height Equivalent to a Theoretical Plate
⟨HETP⟩: column average Height Equivalent to a Theoretical Plate
$k_x$: liquid side mass transfer coefficient based on mole fraction driving force
$k_y$: vapor side mass transfer coefficient based on mole fraction driving force
$K_{Oy}$: overall mass transfer coefficient=$k_x k_y/(k_x+mk_y)$
L: superficial molar liquid flux
m: slope of the y-x equilibrium curve for binary systems:

$$\frac{y_{n-1}-y_n}{x_{n-1}-x_n} \text{ or } \left(\frac{\partial y}{\partial x}\right)_P$$

N: total number of equilibrium stages
$N_A$: molar flux of material across an interface
$Re_L$: liquid phase Reynolds number
$Re_V$: vapor phase Reynolds number
$Sc_L$: liquid phase Schmidt number
$Sc_V$: vapor phase Schmidt number
$Sh_L$: liquid phase Sherwood number
$Sh_V$: vapor phase Sherwood number
$v_L$: superficial liquid velocity
$v_V$: superficial vapor velocity
$We_L$: liquid phase Weber number
x: liquid phase mole fraction
y: vapor phase mole fraction
α: binary relative volatility
λ: mG/L
$μ_L$: liquid viscosity
$μ_V$: vapor viscosity
$ρ_L$: liquid density
$ρ_V$: vapor density
σ: surface tension

NOMENCLATURE

AMP: 2-amino-2-methyl-1-propanol
BF82: transfer coefficient/interfacial area correlation given in reference J. L. Bravo and J. R. Fair, 'Generalized Correlation for Mass Transfer in Packed Distillation Columns', Industrial & Engineering Chemistry Process Design and Development, 21 (1982), 162-70.
BRF85: Mass transfer coefficient/interfacial area correlation given in reference J. L. Bravo, J. A. Rocha and J. R. Fair, 'Mass Transfer in Gauze Packings', Hydrocarbon Processing, 64 (1985), 91.
BRF92: Mass transfer coefficient/interfacial area correlation given in reference J. L. Bravo, J. A. Rocha and J. R. Fair, 'A Comprehensive Model for the Performance of Columns Containing Structured Packings', 128 (1992), A439.
BX: metal gauze structured packing with a geometrical surface area of ~500 m²/m³ and a corrugation inclination angle of 30° from the vertical.
CB: chlorobenzene
DX: metal gauze structured packing with a geometrical surface area of ~900 m²/m³ and a corrugation inclination angle of 30° from the vertical.
EB: ethylbenzene
MDEA: methyl-diethanolamine
MEA: monoethanolamine While this invention has been particularly shown and described with references to example embodiments thereof, it will be understood by those skilled in the art that various changes in form and details may be made therein without departing from the scope of the invention encompassed by the appended claims.

What is claimed is:

1. A method of designing or optimizing a column for a separation process, comprising the computer implemented steps of:
    a) in a digital processor, providing vapor-side and liquid-side mass transfer coefficient expressions and a mass transfer area expression relevant for a subject column, the vapor-side and liquid-side mass transfer coefficient expressions and the mass transfer area expression having been derived from defining a column average height equivalent to a theoretical plate (⟨HETP⟩) as a mathematical relationship in which ⟨HETP⟩:
        i) is proportional to a vapor flow rate;
        ii) is inversely proportional to effective packing area participating in mass transfer;
        iii) has a first correction factor with respect to liquid-side mass transfer; and
        iv) has a second correction factor with respect to vapor-side mass transfer; resulting in a defined ⟨HETP⟩ and from reducing error of curve fitting ⟨HETP⟩ empirical data of various columns by using the defined ⟨HETP⟩ to obtain expressions for the vapor-side and liquid-side mass transfer coefficients and mass transfer area;
    b) using the expressions resulting from step a) to determine column height and column width configurations of the subject column; and
    c) outputting the column height and column width configurations of the subject column.

2. The method of claim 1, wherein the subject column is an existing column, and the determined column height and column width configurations are used for rating performance of the subject column.

3. The method of claim 1, wherein the ⟨HETP⟩ empirical data are data from separation processes employing members of a packing family.

4. The method of claim 1, wherein the mathematical relationship defining ⟨HETP⟩ is:

$$\langle HETP \rangle = \frac{G}{a_m}\left(\frac{C_x}{k_x} + \frac{C_y}{k_y}\right),$$

wherein
G is molar vapor flux,
$a_m$ is packing area participating in mass transfer,
$C_X$ is the first correction factor with respect to liquid-side mass transfer,
$k_x$ is liquid-side mass transfer coefficient
$C_y$ is the second correction factor with respect to vapor-side mass transfer, and
$k_y$ is vapor-side mass transfer coefficient.

5. The method of claim 4, wherein the first correction factor $C_x$ and the second correction factor $C_y$ are each dependent on composition at the top of the column and composition at the bottom of the column.

6. The method of claim 5, wherein the first correction factor is:

$$C_x = \frac{\int_{x_b}^{x_t} \left(\frac{m(x)}{x(1-x)\ln\alpha(x)}\right)\frac{\ln[m(x)]}{m(x)-1} dx}{\int_{x_b}^{x_t} \frac{dx}{x(1-x)\ln\alpha(x)}}$$

and the second correction factor is:

$$C_y = \frac{\int_{x_b}^{x_t} \left(\frac{1}{x(1-x)\ln\alpha(x)}\right)\frac{\ln[m(x)]}{m(x)-1} dx}{\int_{x_b}^{x_t} \frac{dx}{x(1-x)\ln\alpha(x)}},$$

wherein
   $x_t$ is liquid phase mole fraction at the top of the column,
   $x_b$ is liquid phase mole fraction at the bottom of the column,
   $m(x)$ is slope of the y-x equilibrium curve for binary systems, and
   $\alpha(x)$ is binary relative volatility.

7. The method of claim 6, wherein the mathematical relationship defining $\langle HETP \rangle$ is:

$$\langle HETP \rangle = \frac{G d_e}{\left(A'_M \left(\frac{\rho_V}{\rho_L}\right)^A \left(\frac{\mu_V}{\mu_L}\right)^B Re_L^X Fr_L^\Delta We_L^E Re_V^\Phi a_d\right)} \left(\frac{C_y}{A'_V Re_V^m Sc_V^n c_V D_V} + \frac{C_x}{Re_L^b Sc_L^c c_L D_L}\right)$$

wherein A, B, X, Δ, E, and Φ are power law exponents, $A'_M = A_M A_L$ and $A'_V = A_V / A_L$.

8. The method of claim 7, wherein the parameters A, B, X, Δ, E, Φ, $A'_M$, and $A'_V$ are obtained by:
   (1) performing least squares regression on vapor-phase-controlled empirical data;
   (2) using liquid-phase-controlled empirical data, comparing calculated column temperature profile and calculated column performance to the empirical data; and
   (3) adjusting a front factor $A_L$ on the liquid side mass transfer correlation to fit the liquid-phase-controlled empirical data while maintaining quality of fit to the $\langle HETP \rangle$ empirical data.

9. The method of claim 8, wherein the vapor-phase-controlled empirical data are $\langle HETP \rangle$ data from distillation processes.

10. The method of claim 8, wherein the liquid-phase-controlled empirical data include liquid-phase-controlled gas absorption data and liquid stripping data.

11. The method of claim 10, wherein liquid-phase-controlled gas absorption data include carbon dioxide absorption data and chlorine absorption data.

12. The method of claim 11, wherein the calculated column performance is calculated liquid loading and calculated percent removal from the vapor.

13. The method of claim 10, wherein liquid stripping data include removal of oxygen from water and removal of hydrogen sulfide from an acidic solution.

14. The method of claim 1, wherein the relationship defining $\langle HETP \rangle$ is dimensionally consistent.

15. The method of claim 14, wherein the step of defining $\langle HETP \rangle$ as a mathematical relationship includes identifying plural physical quantities on which the liquid-side and vapor-side mass transfer coefficients and mass transfer area depend.

16. The method of claim 15, wherein the physical quantities on which the liquid-side mass transfer coefficient depends include liquid velocity, liquid density, liquid viscosity, liquid-phase molar concentration, liquid-phase binary diffusivity, and equivalent diameter.

17. The method of claim 15, wherein the physical quantities on which the vapor-side mass transfer coefficient depends include vapor velocity, vapor density, vapor viscosity, vapor-phase molar concentration, vapor-phase binary diffusivity, and equivalent diameter.

18. The method of claim 15, wherein the physical quantities on which the mass transfer area depends include vapor density, vapor viscosity, vapor velocity, liquid density, liquid viscosity, liquid velocity, surface tension, equivalent diameter, and acceleration due to gravity.

19. A computer apparatus for designing or optimizing a column for a separation process, comprising:
   a digital processor member having vapor-side and liquid-side mass transfer coefficient expressions and a mass transfer area expression relevant for a subject column, the vapor-side and liquid-side mass transfer coefficient expressions and the mass transfer area expression having been derived from defining column average height equivalent to a theoretical plate $\langle HETP \rangle$ of a subject column as a mathematical relationship in which $\langle HETP \rangle$:
      i) is proportional to a vapor flow rate;
      ii) is inversely proportional to effective packing area participating in mass transfer;
      iii) has a first correction factor with respect to liquid-side mass transfer; and
      iv) has a second correction factor with respect to vapor-side mass transfer;
   resulting in a defined $\langle HETP \rangle$ and from reducing error of curve fitting $\langle HETP \rangle$ empirical data of various columns by using the defined $\langle HETP \rangle$ to obtain expressions for the vapor-side and liquid-side mass transfer coefficients and the mass transfer area;
   a processing unit operatively coupled to the digital processor member, the processing unit using the expressions for the vapor-side and liquid-side mass transfer coefficients and the mass transfer area to determine column height and column width configurations of the subject column; and
   an output module coupled to receive the determined column width and column height configurations and providing an indication of the determined configurations of the subject column as output.

20. The apparatus of claim 19, wherein the subject column is an existing column, and the determined column height and column width configurations are used for rating performance of the subject column.

21. The apparatus of claim 19, wherein the $\langle HETP \rangle$ empirical data are data from separation processes employing members of a packing family.

22. The apparatus of claim 19, wherein the mathematical relationship defining ⟨HETP⟩ is:

$$\langle HETP \rangle = \frac{G}{a_m}\left(\frac{C_x}{k_x} + \frac{C_y}{k_y}\right),$$

wherein
G is molar vapor flux,
$a_m$ is packing area participating in mass transfer,
$C_x$ is the first correction factor with respect to liquid-side mass transfer,
$k_x$ is liquid-side mass transfer coefficient
$C_y$ is the second correction factor with respect to vapor-side mass transfer, and
$k_y$ is vapor-side mass transfer coefficient.

23. The apparatus of claim 22, wherein the first correction factor $C_x$ and the second correction factor $C_y$ are each dependent on composition at the top of the column and composition at the bottom of the column.

24. The apparatus of claim 23, wherein the first correction factor is:

$$C_x = \frac{\int_{x_b}^{x_t}\left(\frac{m(x)}{x(1-x)\ln\alpha(x)}\right)\frac{\ln[m(x)]}{m(x)-1}dx}{\int_{x_b}^{x_t}\frac{dx}{x(1-x)\ln\alpha(x)}}$$

and the second correction factor is:

$$C_y = \frac{\int_{x_b}^{x_t}\left(\frac{1}{x(1-x)\ln\alpha(x)}\right)\frac{\ln[m(x)]}{m(x)-1}dx}{\int_{x_b}^{x_t}\frac{dx}{x(1-x)\ln\alpha(x)}},$$

wherein
m(x) is slope of the y-x equilibrium curve for binary systems, and
α(x) is binary relative volatility.

25. The apparatus of claim 24, wherein the mathematical relationship defining ⟨HETP⟩ is:

$$\langle HETP \rangle = \frac{Gd_e}{\left(A'_M\left(\frac{\rho_V}{\rho_L}\right)^A\left(\frac{\mu_V}{\mu_L}\right)^B Re_L^X Fr_L^\Delta We_L^E Re_V^\Phi a_d\right)}$$

$$\left(\frac{C_y}{A'_V Re_V^m Sc_V^n c_V D_V} + \frac{C_x}{Re_L^b Sc_L^c c_L D_L}\right)$$

wherein A, B, X, Δ, E, and Φ are power law exponents, $A'_M = A_M A_L$ and $A'_V = A_V/A_L$.

26. The apparatus of claim 25, wherein the parameters A, B, X, Δ, E, Φ, $A'_M$, and $A'_V$
are obtained by:
(1) performing least squares regression on vapor-phase-controlled empirical data;
(2) using liquid-phase-controlled empirical data, comparing calculated column temperature profile and calculated column performance to the empirical data; and
(3) adjusting a front factor $A_L$ on the liquid side mass transfer correlation to fit the liquid-phase-controlled empirical data while maintaining quality of fit to the ⟨HETP⟩ empirical data.

27. The apparatus of claim 25, wherein the vapor-phase-controlled empirical data are ⟨HETP⟩ data from distillation processes.

28. The apparatus of claim 26, wherein the liquid-phase-controlled empirical data include liquid-phase-controlled gas absorption data and liquid stripping data.

29. The apparatus of claim 28, wherein liquid-phase-controlled gas absorption data include carbon dioxide absorption data and chlorine absorption data.

30. The apparatus of claim 29, wherein the calculated column performance is calculated liquid loading and calculated percent removal from the vapor.

31. The apparatus of claim 28, wherein liquid stripping data include removal of oxygen from water and removal of hydrogen sulfide from an acidic solution.

32. The apparatus of claim 19, wherein the relationship defining ⟨HETP⟩ is dimensionally consistent.

33. The apparatus of claim 32, wherein the step of defining ⟨HETP⟩ as a mathematical relationship includes identifying plural physical quantities on which the liquid-side and vapor-side mass transfer coefficients and mass transfer area depend.

34. The apparatus of claim 33, wherein the physical quantities on which the liquid-side mass transfer coefficient depends include liquid velocity, liquid density, liquid viscosity, liquid-phase molar concentration, liquid-phase binary diffusivity, and equivalent diameter.

35. The apparatus of claim 33, wherein the physical quantities on which the vapor-side mass transfer coefficient depends include vapor velocity, vapor density, vapor viscosity, vapor-phase molar concentration, vapor-phase binary diffusivity, and equivalent diameter.

36. The apparatus of claim 33, wherein the physical quantities on which the mass transfer area depends include vapor density, vapor viscosity, vapor velocity, liquid density, liquid viscosity, liquid velocity, surface area, equivalent diameter, and acceleration due to gravity.

* * * * *

UNITED STATES PATENT AND TRADEMARK OFFICE
CERTIFICATE OF CORRECTION

PATENT NO. : 8,650,013 B2  
APPLICATION NO. : 13/192192  
DATED : February 11, 2014  
INVENTOR(S) : Brian Hanley Page 1 of 1

It is certified that error appears in the above-identified patent and that said Letters Patent is hereby corrected as shown below:

In the Claims

In Column 34, line 18, please delete "25" and insert --26--.

Signed and Sealed this
Thirteenth Day of May, 2014

Michelle K. Lee
*Deputy Director of the United States Patent and Trademark Office*